US006735182B1

(12) United States Patent
Nishimori et al.

(10) Patent No.: US 6,735,182 B1
(45) Date of Patent: May 11, 2004

(54) ADAPTIVE ARRAY ANTENNA SYSTEM

(75) Inventors: Kentaro Nishimori, Kanagawa (JP); Keizo Cho, Kanagawa (JP); Yasushi Takatori, Kanagawa (JP); Toshikazu Hori, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/581,512

(22) PCT Filed: Nov. 19, 1999

(86) PCT No.: PCT/JP99/06471

§ 371 (c)(1),
(2), (4) Date: Jun. 19, 2000

(87) PCT Pub. No.: WO00/31823

PCT Pub. Date: Jun. 2, 2000

(30) Foreign Application Priority Data

Nov. 19, 1998 (JP) .......................................... 10-328895

(51) Int. Cl.[7] .............................. H04L 5/14; H04Q 7/00

(52) U.S. Cl. ....................... 370/294; 370/328; 370/334; 342/372; 455/562.1

(58) Field of Search ................................ 370/276, 280, 370/294, 328, 334; 455/69, 562.1; 342/367, 372

(56) References Cited

U.S. PATENT DOCUMENTS 6,400,318 B1 * 6/2002 Kasami et al. .............. 342/383
6,654,590 B2 * 11/2003 Boros et al. ............. 455/67.14

FOREIGN PATENT DOCUMENTS

JP 2-265302 10/1990
JP A-9-219615 8/1997
JP 10-170633 6/1998

OTHER PUBLICATIONS

"Space Division Multiple Access (SDMA) Field Trials. Part 2: Calibration and Linearity Issues", Tsoulos et al, *IEE Proc.–Radar, Sonar Navig.*, vol. 145, No. 1, Feb. 1998.

"Calibration and Linearity Issues for an Adaptive Antenna System", Tsoulos et al, *IEEE 47th Vehicular Technology Conference*, May 4–7, 1997, pp. 1597–1600.

"Downlink Calibration Requirements for the TSUNAMI (II) Adaptive Antenna Testbed", Simmonds et al, *IEEE*, 1998, pp. 1260–1264.

"Digital Beamforming in Wireless Communications", Litva et al, *Artech House Publishers*, 1996, pp. 245–246.

"A Method for Measuring Amplitude and Phase of Each Radiating Element of a Phased Array Antenna", Mano et al, *Technical Journal(B) of IEICE*, vol. J65–B, No. 5, May 1982, pp. 555–560.

* cited by examiner

*Primary Examiner*—Duc Ho
(74) *Attorney, Agent, or Firm*—Arent Fox PLLC

(57) ABSTRACT

In an array antenna used in a transceiver in a time division communication system such as TDD (Time Division Duplex) system, amplitude and phase of each antenna element are calibrated in a transceiver itself during actual communication without using external information. A first transmitter (1-3-1) has means (1-5-1) to send a transmit signal to an antenna element (1-1-1) as well as to at least one of the receivers (1-4-1 through 1-4-N). Other transmitter (1-3-2 through 1-3-k) except the first transmitter has means (1-5-k) which sends a transmit signal to a related antenna element (1-1-2 through 1-1-k) as well as to a first receiver (1-4-1) which relates to the first transmitter. Amplitude/phase value obtained in the first receiver (1-4-1) and amplitude/phase values obtained in other receivers (1-4-2 through 1-4-k) except the first receiver provide weighted amplitude/phase values of each antenna elements according to desired desired radiation pattern.

9 Claims, 14 Drawing Sheets

ADAPTIVE ARRAY ANTENNA SYSTEM

TECHNICAL FIELD

The present invention relates to an adaptive array antenna system, in particular, relates to such a system which can automatically calibrate amplitude and phase of each array antenna elements during communication in the system itself used in communication system such as TDD (Time Division Duplex) which carries out transmission and reception on time division basis.

BACKGROUND OF THE INVENTION

Lately, due to rapid expansion of mobile communication such as a portable telephone set and/or PHS (Personal Handyphone System), it becomes essential to have subscribers as many as possible in limited frequency band. Therefore, a multi-channel access system in which a specific channel is shared by a plurality of subscribers is now widely used in mobile communication system. The typical multi-channel access system used in the current mobile communication system such as cellular system and/or PHS, is Time Division Multiple Access (TDMA) system. Further, in a micro-cell system which is excellent in frequency usage efficiency, a Time Division Duplex (TDD) system which shares transmission and reception on the same frequency on time division basis is used.

On the other hand, it is essential to get rid of interference from adjacent cells in order to have high frequency usage efficiency in radio channels. The conventional technique to improve frequency usage efficiency is the use of an adaptive array antenna system. This is described in Monzingo et al, "Introduction to Adaptive Array", John willy & Sons, New York, 1980. An adaptive array antenna system has an array of antenna elements each having weighted input signals for amplitude and phase so that the antenna system has null directivity on a radiation pattern in the direction of an interference wave to get rid of affection of an interference wave.

FIG. 13 shows a conventional configuration when an adaptive array antenna is used in a TDD system. When an adaptive array antenna is used in a TDD system, it is possible to use a radiation pattern of an antenna in a receive side as a radiation pattern in a transmit side as it is since transmit frequency is the same as receive frequency. Therefore, an adaptive array antenna is suitable to a TDD system considering transmit characteristics.

In FIG. 13, numerals 13-1-1 through 13-1-N show N (N is an integer larger than 2) number of element antennas, each coupled with transmitters 13-3-1 through 13-3-N or receivers 13-4-1 through 13-4-N through transmit/receive switches 13-2-1 through 13-2-N.

A receive signal is applied to a receiver through an antenna element, and a transmit/receive switch. An output of the receiver is applied to a radiation pattern control calculation circuit 13-7 (or direction control calculation circuit) which calculates amplitude and phase of each channel. A weight multiplier circuit 13-6 multiplies said amplitude and said phase to a signal to be transmitted, and the product is applied to antenna elements through transmitters and transmit/receive switches. The amplitude and the phase of the antenna elements are controlled by the weight multiplier circuit so that a desired shape of an antenna beam is obtained.

Accordingly, when the radiation pattern control calculation circuit provides the amplitude and the phase of each channels, and the weight multiplier circuit provides the product of said amplitude and the phase, and the transmit signal, the transmit radiation pattern is essentially the same as the receive radiation pattern.

However, although an amplitude and a phase of an antenna element should be ideally the same as those in all the antenna elements, they are actually different from one another because of an error of a high frequency circuit including a power amplifier, a connection cable, and/or temperature variation where an apparatus is mounted. The error degrades null and side lobe, so that interference suppression characteristics of an adaptive array antenna are degraded. This is described in J. Litva et al, "Digital Beamforming in Wireless Communications", Artech House Publishers, 1996.

FIG. 11 shows an example of the degradation. FIG. 11 shows three elements circularly arranged array antenna. FIG. 11(*a*) shows the case of ideal amplitude/phase relations, and FIG. 11(*b*) shows the depth of null in the radiation pattern because of an error of amplitude and/or phase of each antenna element. When it is ideal, a pattern having a null in 180° direction is obtained as shown in FIG. 11(*a*). However, when an error exists in amplitude and/or phase in each antenna element, a radiation pattern is considerably degraded as shown in FIG. 11(*b*). Accordingly, when transmit radiation pattern should coincide with receive radiation pattern of an adaptive array antenna in TDD system, amplitude and phase in each branches in an array antenna should be adjusted.

Conventionally, when amplitude and phase of an array antenna is adjusted, a signal from far field, or a signal transmitted by an array antenna in far field is received, and phase of each branches is sequentially rotated. This is called an element field vector rotation method, and is described in "A Method for Measuring Amplitude/Phase of Antenna Element in Phased Array Antenna", by Mano, and Kataki, in Technical Journal (B), published by Institute of Electronics, Information and Communication in Japan, vol. J-65-B, No.5, pages 555–560.

However, when base stations are not positioned regularly in a micro-cell mobile communication system, but are positioned considering elimination of out-of-service area in a service area, and/or traffic, it is impossible to use above method in each base stations.

Further, when we try that a terminal station transmits a signal for adjustment purpose, said signal must be transmitted during actual communication, and therefore, transmission efficiency of a communication frame is decreased.

Accordingly, in an environment of mobile communication system, it is desired that amplitude and phase of each branch is adjusted by using an actual communication apparatus itself.

A prior proposal to adjust amplitude and phase of each branch by using an actual communication apparatus itself, is that an apparatus has a reference signal for adjustment purpose, and an array antenna is adjusted by using said reference signal. This is described in H. Steyscal et al, "Digital Beamforming for Readers", Microwave Journal, vol.32, no.1, pp121–136. The configuration of the adjustment circuit in that article is shown in FIG. 12.

In FIG. 12, an array antenna is adjusted as follows.

(1) A reference signal generator 12-11 sends a signal which is common to all the branches to a receiver 12-3 through a separator 12-14*a*. An adjusted value for each receiver is determined based upon a value received in each receiver and a reference value which is a received value by a specific receiver.

(2) A transmitter 12-4 sends a signal to a receiver through a switch 12-13, and an attenuator 12-12. The adjusted value is obtained by an output of each receiver, and a reference value of a reference receiver which is defined in said process (1).

(3) The transmit adjustment value is obtained by the difference of said process (1) and said process (2).

Accordingly, FIG. 12 can adjust amplitude and phase of each branch of an array antenna by using only a communication apparatus.

However, FIG. 12 carries out the adjustment of a transmitter and a receiver independently, and therefore has the disadvantage that an adjustment can not be carried out during actual communication in TDD system which carries out transmission and reception on time division multiplex system. Therefore, it can not follow the change of environment such as temperature variation during communication and/or change of location of base stations.

An object of the present invention is to provide an adaptive array antenna which can be adjusted during actual communication by using only a communication apparatus itself. The present invention does not use an external signal for adjustment of amplitude and phase of each branch, and therefore, no degradation of transmission efficiency occurs.

SUMMARY OF THE INVENTION

The feature of the invention to attain the above objects resides in an adaptive array antenna system comprising; N (N=>2, N is an integer) number of antenna elements (1-1-1 through 1-1-N); N number of transmitters (1-3-1 through 1-3-N); N number of receivers (1-4-1 through 1-4-N); a directivity calculation circuit (1-7) for controlling radiation pattern of said adaptive antenna system by weighting amplitude and phase of signals applied to a respective receiver related to each antenna element, and combining weighted signals; said adaptive array antenna being used in Time Division Duplex communication system; each transmitter being coupled with a related antenna element during transmit time slot in communication, and having means (1-5-1 through 1-5-N) for sending a part of transmit signal to at least one receiver; amplitude/phase calibration calculation circuit (1-6) receiving outputs of at least two receivers which receive a signal from a transmitter during transmit time slot, and providing amplitude/phase calibration value of a branch related to said transmitter and said receivers by ratio of outputs of said at least two receivers.

In an embodiment of the present invention, an adaptive array antenna system according to the present invention comprises; N (N=>2, N is an integer) number of antenna elements (2-1-1 through 2-1-N); N number of transmitters (2-3-1 through 2-3-N); N number of receivers (2-4-1 through 2-4-N); N number of first switches (2-2-1 through 2-2-N) provided for each antenna element for selectively coupling a respective antenna element either to a respective transmitter or to a respective receiver; a radiation pattern control calculation circuit (2-10) for controlling radiation pattern of said array antenna by weighting signals applied to each receivers with amplitude and phase, and combining weighted signals; a weight multiplier circuit (2-11) for multiplying transmit signal and amplitude and phase obtained in said radiation pattern control calculation circuit; N number of separators (2-5-1 through 2-5-N) provided for each transmitters for coupling an output of a respective transmitter to a respective antenna element and separating a part of transmit signal; a second switch (2-6) for coupling a signal separated by the first separator (2-5-1) with one of second through N'th receivers (2-4-2 through 2-4-N); a third switch (2-7) for coupling signals separated by second through N'th separators (2-5-2 through 2-5-N) with the first receiver (2-4-1); fourth switches (2-8-1 through 2-8-N) for coupling an input of each receiver (2-4-i) with either a signal of a respective antenna element (2-1-i) through a respective first switch (2-2-i), or a signal from said second switch (2-6) or said third switch (2-7); an amplitude/phase calibration value calculation circuit (2-9) for providing amplitude/phase calibration value of each antenna element by using an amplitude value and a phase value obtained in each receivers.

Preferably, said amplitude/phase calibration value calculation circuit (2-9) provides calibration value of i'th antenna element by; separating a signal from first transmitter (2-3-1); coupling the separated signal with i'th (2=<i=<N, i is an integer) fourth switch (2-8-i) through said second switch (2-6); obtaining a value (1) at an output of said i'th receiver (2-4-i) which receives said separated signal through i'th fourth switch (2-8-i); separating a signal from i'th transmitter (2-3-i); coupling the separated signal with first fourth switch (2-8-1) through said third switch (2-7); obtaining a value (2) at an output of first receiver (2-4-1) which receives said separated signal from i'th transmitter (2-4-i); and providing ratio of (said value (1))/(said value (2)) as calibration value of i'th branch.

According to another embodiment of the present invention, an adaptive array antenna system comprises; N (N=>2, N is an integer) number of antenna elements (4-1-1 through 4-1-N); N number of transmitters (4-3-1 through 4-3-N); N number of receivers (4-4-1 through 4-4-N); first switches (4-2-1 through 4-2-N) provided for each antenna element for switching an antenna element (4-1-i) either to a respective transmitter (4-3-i) or to a respective receiver (4-4-i); a radiation pattern control calculation circuit (4-10) for controlling radiation pattern of said adaptive array antenna system by weighting amplitude and phase of a signal applied to each receivers and combining weighted values; a weight multiplier circuit (4-11) for multiplying transmit signal, and amplitude and phase obtained in said radiation pattern control calculation circuit; N number of separators (4-5-1 through 4-5-N) for separating an output of each transmitter into two signals; (N−2) number of second switches (4-6-2 through 4-6-(N−1)) for connecting an input of k'th receiver (4-4-k) either to (k−1)'th separator (4-5-k) (2<=k<=N−1, k is an integer) or to (k+1)'th separator (4-5-(k+1)); (N−2) number of third switches (4-7-2 through 4-7-(N−1)) for connecting k'th separator (4-5-k) either to an input of (k−−1)'th receiver (4-4-(k−1)) or an input of (k+1)'th receiver (4-4-(k+1)); fourth switches (4-8-1 through 4-8-N) for connecting an input of a respective receiver (4-4-i) either to a respective antenna element (4-1-i) through one (4-2-i) of said first switches, or to a signal from said second switch (4-6-i) or said third switch (4-7-i); an amplitude/phase calibration value calculation circuit (4-9) for providing amplitude/phase calibration value of each antenna element by using an amplitude value and a phase value obtained in each of said receivers.

Preferably, said amplitude/phase calibration value calculation circuit (4-9) calculates;

$C(i)=A(i)/B(i)$, ($1<=i<=N-1$, $i$ is an integer) and assigns amplitude/phase calibration value of $(i+1)$'th branch so that;

$C(i)$ when $i=1$ $D(i)=C(i-1)C(i)$ when $i\neq1$ where A(i) is an output of (i+1)'th receiver (4-4-(i+1)) which receives an output of i'th transmitter (4-3-i) through i'th separator (4-5-i), said second switch (4-6-(i+1)), and (i+1)'th fourth switch (4-8-(i+1)), and B(i) is an output of i'th receiver (4-4-i) which receives an output of (i+1)'th transmitter (4-3-(i+1)) through (i+1)'th separator (4-5-(i+1)), said third switch (4-7-i), and i'th fourth switch (4-8-i).

According to still another embodiment of the present invention, an adaptive array antenna system comprises; N (N=>2, N is an integer) number of antenna elements (6-1-1 through 6-6-N); N number of transmitters (6-3-1 through 6-3-N); N number of receivers (6-4-1 through 6-4-N); first switches (6-2-1 through 6-2-N) for switching each antenna element (6-1-i) either to a respective transmitter (6-3-i) or to a respective receiver (6-4-i); a radiation pattern control calculation circuit (6-10) for controlling radiation pattern of said adaptive array antenna system by weighting amplitude and phase of a signal applied to each receivers and combining weighted values; a weight multiplier circuit (6-11) for multiplying transmit signal, and amplitude and phase obtained in said radiation pattern control calculation circuit; N number of separators (6-5-1 through 6-5-N) provided for each transmitters for separating an output signal of each transmitter; a second switch (6-6) for connecting a signal from a first separator (6-5-1) to one of first through N'th receivers (6-4-1 through 6-4-N); a third switch (6-7) for connecting an input of a first receiver (6-4-1) to one of first through N'th separators (6-5-1 through 6-5-N); N number of fourth switches (6-8-1 through 6-8-N) for connecting an input of a respective receiver (6-8-i) either to a first antenna element (6-1-1) through a first switch (6-2-1), or to a signal from a second switch (6-6) or a third switch (6-7); an amplitude/phase calibration value calculation circuit (6-9) for providing amplitude/phase calibration value of each antenna element by using an amplitude value and a phase value obtained in each receivers.

Preferably, said amplitude/phase calibration value calculation circuit (6-9) provides calibration value of i'th antenna element by; separating a signal from a first transmitter (6-3-1) by using a first separator (6-5-1); coupling the separated signal with i'th (1<=i<=N, i is an integer) fourth switch (6-8-i) through said second switch (6-6); obtaining a value (1) at an output of i'th receiver (6-4-i) which receives said separated signal through i'th fourth switch (6-8-i); separating a signal from i'th transmitter (6-3-i) by using an i'th separator (6-5-i); coupling the separated signal with first fourth switch (6-8-1) through said third switch (6-7); obtaining a value (2) at an output of a first receiver (6-4-1) which receives said separated signal from i'th transmitter (6-3-1) through said first fourth switch (6-8-1); and providing ratio of (said value (1))/(said value (2)) as calibration value of i'th antenna element.

According to still another embodiment of the present invention, an adaptive array antenna system comprises; N (N>=2, N is an integer) number of antenna elements (9-1-1 through 9-1-N); N number of transmitters (9-3-1 through 9-3-N); N number of receivers (9-4-1 through 9-4-N); a first switch (9-2-1 through 9-2-N) provided for each antenna elements for switching an antenna element either to a respective transmitter or to a respective receiver; a radiation pattern control calculation circuit (9-10) for controlling radiation pattern of said adaptive array antenna system by weighting amplitude and phase of a signal applied to each receivers and combining weighted values; a weight multiplier circuit (9-11) for multiplying transmit signal, and amplitude and phase obtained in said radiation pattern control calculation circuit; N number of separators (9-5-1 through 9-5-N) provided for each transmitters for separating a signal from a respective transmitter; a second switch (9-6) for connecting a signal of a first separator (9-5-1) to one of first through N'th receivers (9-4-1 through 9-4-N); a third switch (9-7-2 through 9-7-N) for connecting an input of k'th receiver either from a first separator (9-5-1) or from k'th (2<=k<=N, k is an integer) separator; N number of fourth switches (9-8-1 through 9-8-N) for connecting an input of a respective receiver to a signal either from a respective antenna element through a respective first switch, or from said second switch or said third switch; an amplitude/phase calibration value calculation circuit (9-9) for providing amplitude/phase calibration value of each antenna element by using an amplitude value and a phase value obtained in each receivers.

Preferably, said amplitude/phase calibration value calculation circuit calculates;

$$C(i)=A(i)/A(1)$$

$$D(i)=B(k=i)/A(i)$$

and assigns C(i)/D(i) as an amplitude/phase calibration value of i'th antenna element, wherein;

A(i) is an output of i'th receiver (9-4-i) which receives an output of a first transmitter (9-3-1) through a first separator (9-5-1), a second switch (9-6), and i'th fourth switch (9-8-i), and B(k), (2<=k<=N, k is an integer), is an output of k'th receiver (9-4-k) which receives an output of k'th transmitter through k'th separator (9-5-k), a third switch (9-7-2) and k'th fourth switch (9-8-k).

In a prior art, a transmit section in a transceiver is calibrated independently from a receive section in the transceiver in order to coincide a transmit pattern of an antenna with a receive pattern of the antenna. Therefore, both a calibration device for a transmit section and a calibration device for a receive section are requested.

An adaptive array antenna may in general reduce interference in a receive mode by properly forming a directivity of an antenna even when amplitude and/or phase error among branches exists. A transmission is enough by using an antenna pattern which is the optimum in a receive mode, and therefore, both the transmit section and the receive section may be calibrated during transmission period in a TDD system in which transmission and reception are carried out alternately.

According to the present invention, a plurality of loops which feed back a transmit signal to a receiver are provided so that a transmit signal is fed back not only to a receiver of the same branch of the transmitter, but also to receivers of other branches. In other words, a transmit signal is not only fed back to a receiver of the branch of the transmitter as is the case of a prior art, but also a transmit signal is fed back to other branches, so that calibration of both the transmit section and the receive section are obtained.

In an embodiment in FIGS. 2 and 3, a single branch is assigned as a reference branch, and a transmit signal of the reference branch is applied to the receivers of other branches, so that values of a transmitter and a receiver are calibrated during communication, and an amplitude/phase calibration value calculation circuit is calibrated.

In an embodiment in FIGS. 4 and 5, a number of contacts of switches for feed back of a reference signal to receivers are reduced. In this embodiment, a calibration value is calculated between two adjacent branches, initially, a first branch and a second branch. Then, a pair of two branches are shifted in sequence, so that the calibration values of all the branches are obtained. The calibration of an amplitude/phase calibration value calculation circuit is shown in this embodiment.

In an embodiment of FIGS. 6, 7 and 8, not only calibration values of a transmit section and a receive section are obtained during communication, but also, a calibration value of a transmit section is obtained separately from a calibration value of a receive section. The calibration of an amplitude/phase calibration value calculation circuit is also shown in this embodiment.

In an embodiment of FIGS. 9 and 10, not only, calibration values of a transmit section and a receive section are obtained during communication, but also, a calibration value of a transmit section is obtained separately from a calibration value of a receive section. This embodiment has further a feature that a wiring in a calibration circuit is short since a transmit signal except for a reference branch is only fed back to a receiver of the same branch as that of the transmit signal. The calibration of an amplitude/phase calibration value calculation circuit is also shown in this embodiment.

DESCRIPTION OF THE PREFERRED EMBODIMENTS

Figure 14:
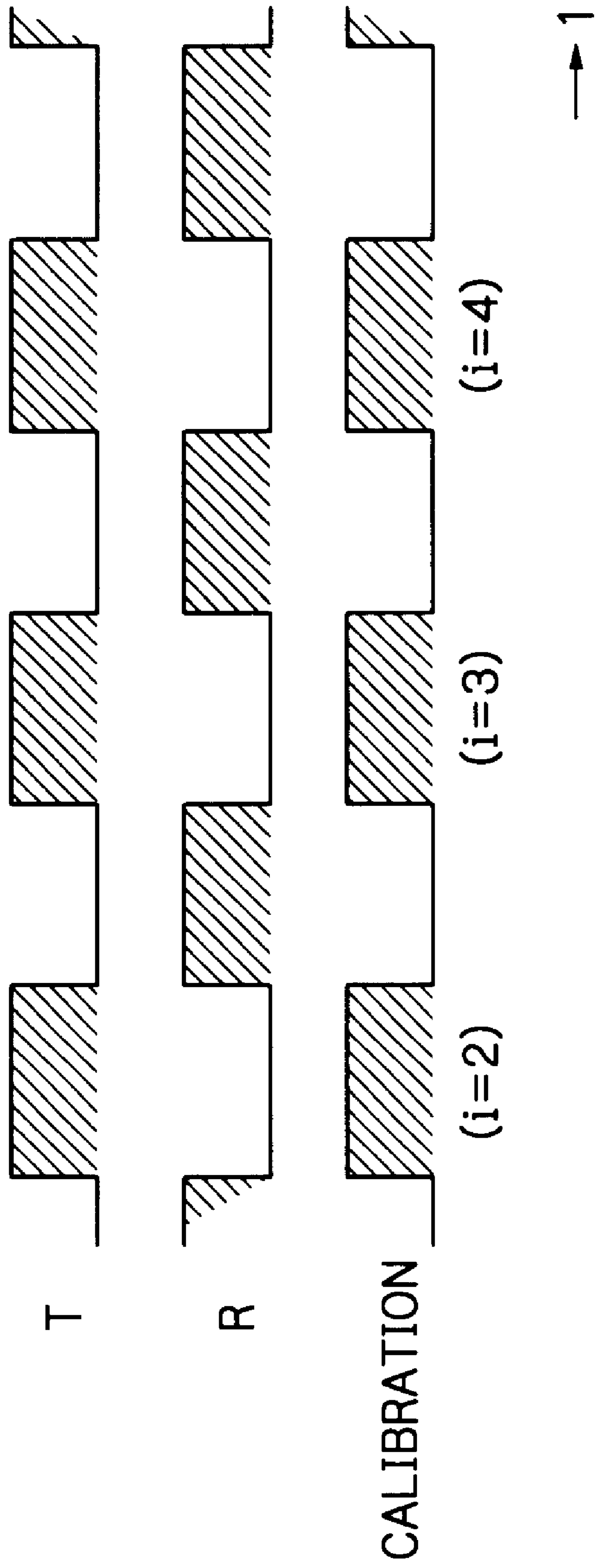
Fig. 14 PRIOR ART
FIG. 14 shows operational time chart when the present invention is used in a TDD communication system.

In a TDD communication system, a transmit time slot T and a receive time slot R are located alternately as shown in FIG. 14. The time length of each time slot is very short. Therefore, a receiver is in idling period during a transmit time slot T. The present invention calibrates an array antenna during the idling period by feeding back a part of a transmit signal to a receiver. In one embodiment, a single antenna element is calibrated in each transmit time slot. For instance, when an antenna element for i=2 is calibrated during a predetermined time slot, another antenna element for i=3 is calibrated during next time slot. All the antenna elements are calibrated by repeating above operation. When calibration for antenna element is completed, an amplitude and a phase for said antenna element are fixed to the calibrated values. The calibration is carried out for every predetermined period (for instance for every one hour).

Figure 1:
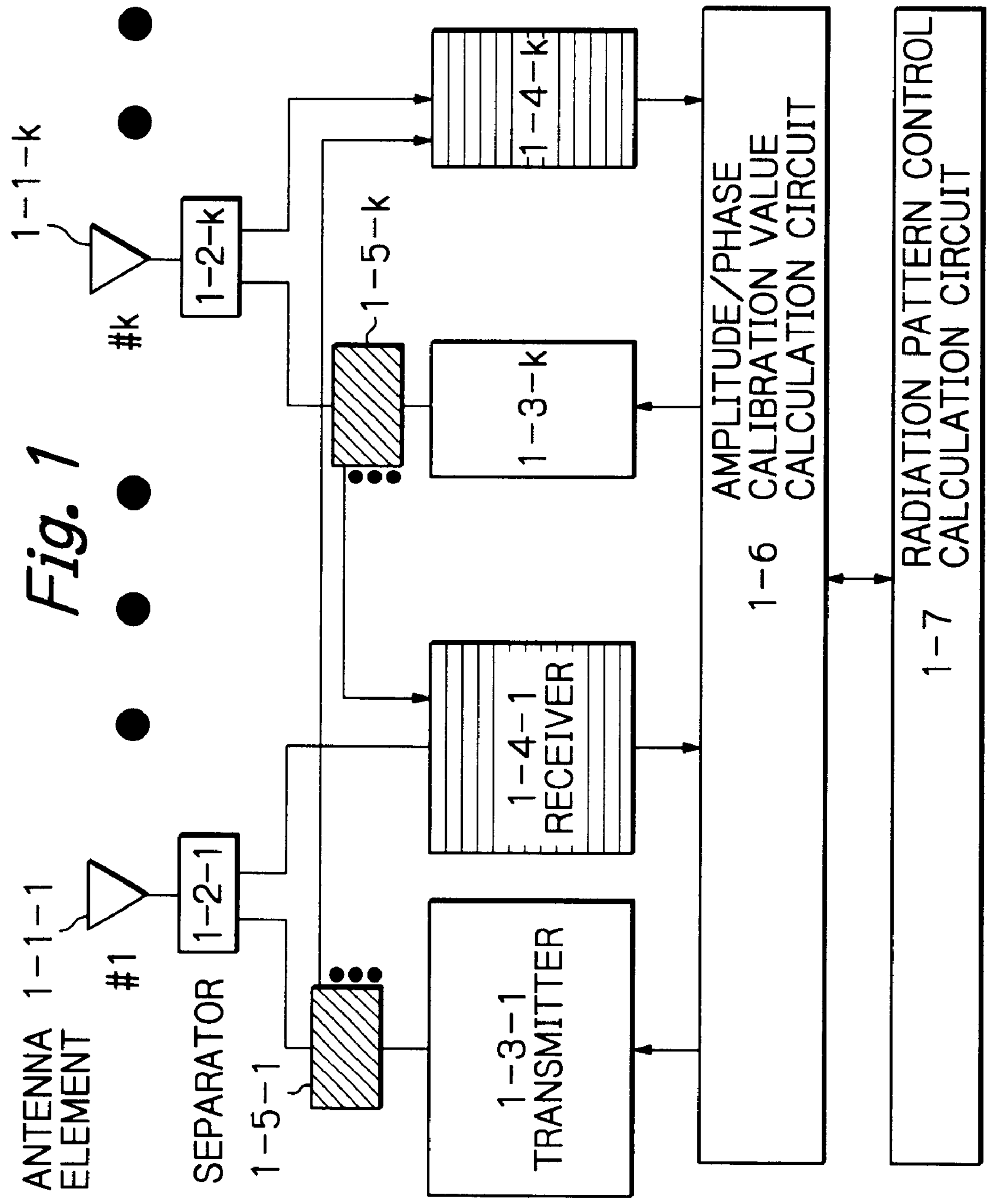
FIG. 1 shows a general configuration of the present invention.

FIG. 1 shows a general block diagram of the present invention. In FIG. 1, the numeral 1-1 (1-1-1 through 1-1-k) is an antenna element, 1-2 (1-2-1 through 1-2-k) is a transmit/receive separation circuit, 1-3 (1-3-1 through 1-3-k) is a transmitter, 1-4 (1-4-1 through 1-4-k) is a receiver, 1-5 (1-5-1 through 1-5-k) is a distributor, 1-6 is an amplitude/phase calibration value calculation circuit, and 1-7 is a radiation pattern control calculation circuit.

The operational principle of the present invention is now described. It is assumed that each parameter is expressed in complex value for the sake of simplicity of expression of an amplitude and a phase. For instance, when an amplitude is A, and a phase is θ, these are expressed by a parameter B, so that $B=A\exp^{(j\theta)}$.

An output $Y_{ri}$ of i'th branch (i'th antenna element) in reception is expressed as follows.

$$y_{ri}=W_{opt}X_i=W_iM_iR_iX_i \quad (1)$$

where $X_i$ is an input signal to an i'th branch, $W_{opt}$ is the optimum weight for the antenna element when no amplitude difference and no phase error exist among branches in reception, and $W_i$ is weight for i'th element obtained by using a reception signal which is subject to amplitude variation and phase variation by a receiver, $M_i$ is amplitude and phase obtained by an antenna and an antenna cable, and $R_i$ is amplitude and phase obtained by a receiver.

On the other hand, an output $y_{ti}$ of an i'th transmitter for radiation to space after radiation pattern control for an array antenna is expressed as follows;

$$y_{ti}=W_is_iM_iT_i \quad (2)$$

where $s_i$ is an output of an i'th transmitter, $T_i$ is amplitude and phase obtained by a transmitter.

The relation $y_{ti}=y_{ri}$ must be satisfied so that a transmit pattern coincides with a receive pattern. When $W_i$ is deleted from the equations (1) and (2), the following equation is obtained.

$$y_{ti}=(W_{opt}/M_iR_i)s_iM_iT_i=W_{opt}s_i(T_i/R_i) \quad (3)$$

In the equation (3), the amplitude and the phase obtained by an antenna element and an antenna cable are cancelled by a transmit side and a receive side. Therefore, the amplitude/phase $K_i$ obtained in an i'th branch is obtained as follows.

$$K_i=R_i/T_i \quad (4)$$

The value $K_i$ is obtained for each branch, then, a specific branch is assigned as a reference branch, and a relative value of the value $K_i$ relative to the reference value is obtained. The relative value provides the calibration of amplitude and phase among branches. For instance, when the reference branch is the first branch, the calibration value $H_i$ of i'th branch is obtained as follows.

$$H_i=(K_i/K_1)=(R_i/T_i)/(R_1/T_1)=T_1R_i/(T_iR_1) \quad (5)$$

The calibrated output $y'_{ti}$ is obtained by using the equations (3) and (5) as follows.

$$y'_{ti}=W_{opt}s_iT_i/R_iH_i=W_{opt}s_i(1/K_i) \quad (6)$$

Since the value K1 is constant in the equation (6), the transmission with the optimum weight in which no amplitude difference and no phase difference exist among branches in reception is possible by using the equation (6).

Accordingly, if the value of the equation (5) is obtained, the calibration of each branches is possible by the measurement only during transmit period.

In order to obtain the value of the equation (5), FIG. 1 feeds back a transmit signal not only to a receiver of the same branch, but also to other branches. For instance, as for k'th branch, the value $T_k/R_k$ is obtained by feeding back a transmit signal to a receiver of the same branch as the transmitter, however, this value is not enough for obtaining the requested calibration values. Therefore, a loop for sending a signal from a first transmitter to a k'th receiver, and a loop for sending a signal from a k'th transmitter to a first receiver are provided between a first branch and a k'th branch, so that $T_1R_k$ and $T_kR_1$ are obtained, respectively. The value of the equation is obtained by the ratio of those values ($T_1R_k$ and $T_kR_1$), and thus, the amplitude/phase calibration value of a k'th transmitter/receiver relative to a first branch is obtained.

Therefore, it should be appreciated that the necessary calibration values are obtained in the present invention by combining loops which feed back a transmit signal to other branches during transmit period.

First Embodiment of the Present Invention

Figure 2:
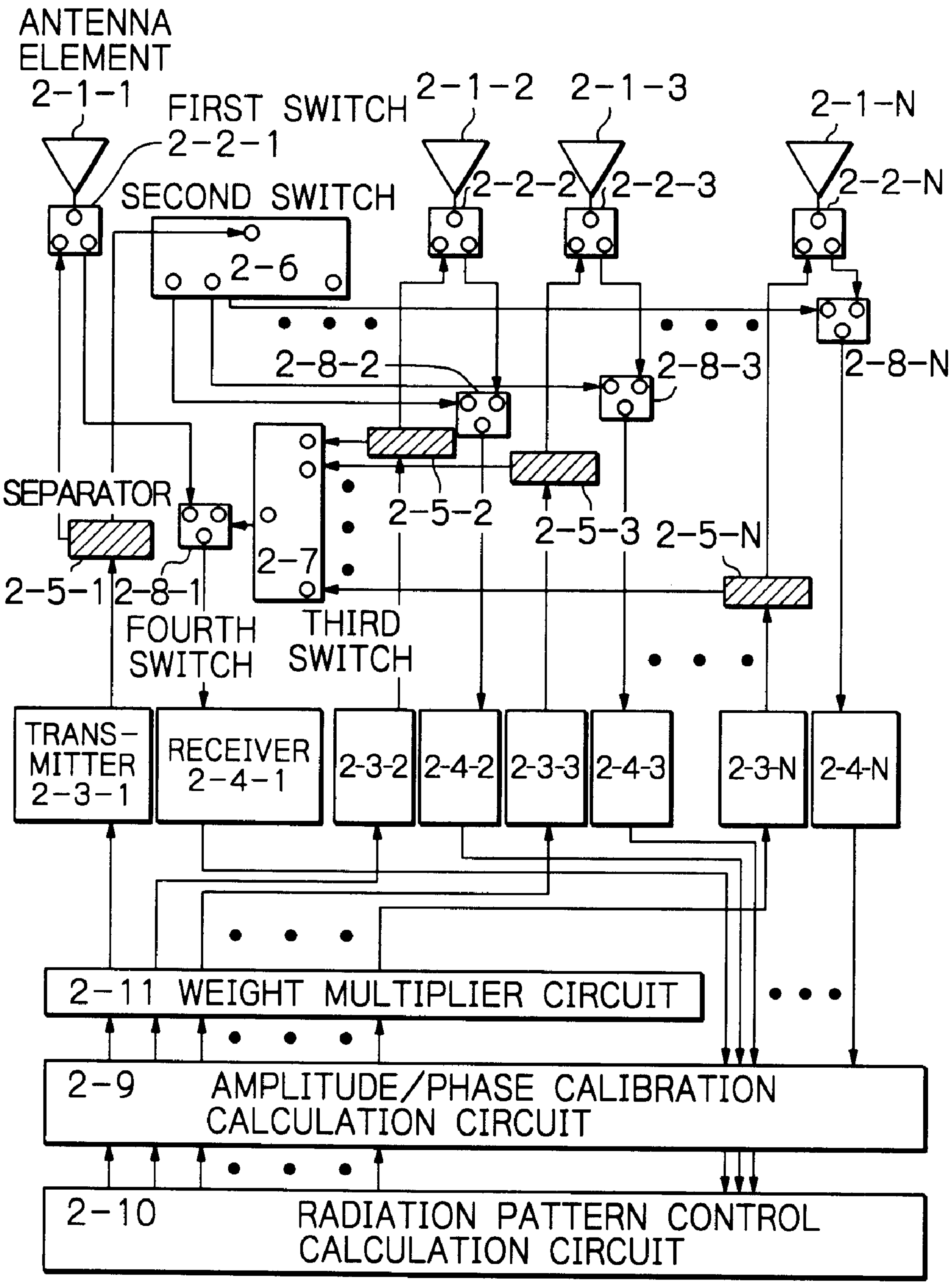
FIG. 2 shows a block diagram of an embodiment of the present invention.
Figure 3:
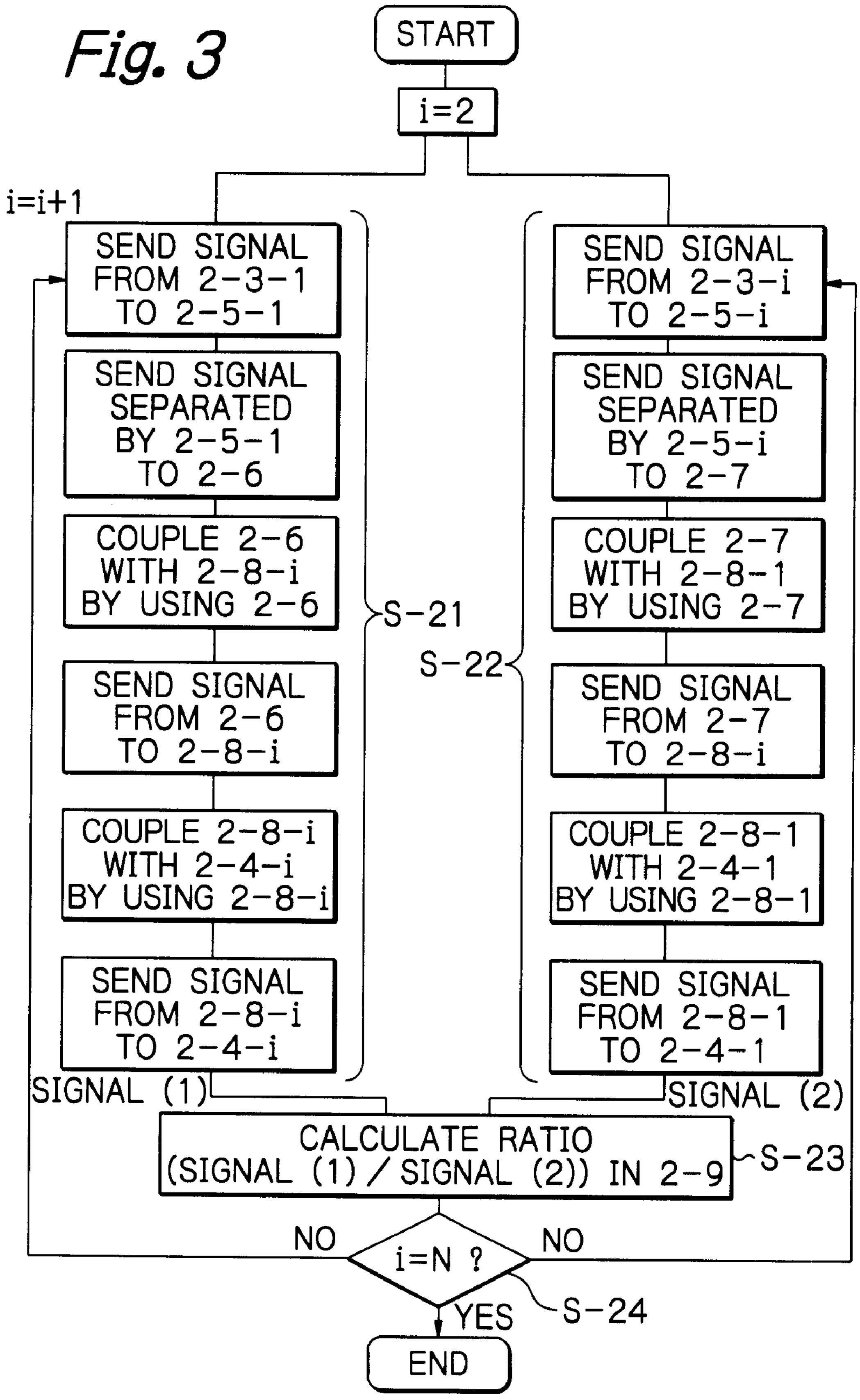
FIG. 3 shows an operational flow chart for calibration according to an embodiment of FIG. 2.

FIG. 2 is a block diagram of the present invention, and FIG. 3 is an operational flow chart showing process for calibration by using the circuit of FIG. 2.

In FIG. 2, the number of branches is N, and i (1=<i=<N), in a symbol 2-k-i, shows an element coupled with an i'th branch. An arrow in FIG. 2 shows the direction of a signal. In the figure, 2-1 (2-1-1 through 2-1-N) shows an antenna element, 2-2 (2-2-1 through 2-2-N) shows a first switch for coupling an antenna element either to a transmitter or a receiver, 2-3 (2-3-1 through 2-3-N) is a transmitter, 2-4 (2-4-1 through 2-4-N) is a receiver, 2-5 (2-5-1 through 2-5-N) is a separator for coupling an output of a transmitter to a related antenna element and separating a part of the output of the transmitter, 2-6 (2-6-1 through 2-6-k) is a second switch for coupling a signal from the first separator 2-5-1 to one of the receivers 2-5-1 through 2-5-N, 2-7 is a third switch for coupling one of the signals from the second separator 2-5-2 through 2-5-N to the first receiver 2-4-1, 2-8 (2-8-1 through 2-8-N) is a fourth switch for coupling either the second switch 2-6 or the third switch 2-7 to a receiver 2-4, 2-9 is an amplitude/phase calibration value calculation circuit, 2-10 is a radiation pattern control calculation circuit, and 2-11 is a weight multiplier circuit.

Now, the process how the equation (5) is obtained for each branches, and the operation of FIG. 2 will be described in accordance with a flow chart of FIG. 3.

(1) A transmitter (2-3-1) in the first branch sends a signal to a receiver (2-4-i) in an i'th branch. This is shown in the box S-21 in FIG. 3. The signal passes a separator (2-5-1), a second switch (2-6) and a fourth switch (2-8). With the process in this step, the amplitude/phase calibration circuit 2-9 receives the value;

$$T_1R_i \tag{7}$$

The reason why a separator is used for sending a signal from 2-3-1 to 2-8 is to attenuate receive level by a receiver, since a power amplifier is provided before an antenna stage for providing enough transmit power, and therefore, a receive level would be too high and exceed an allowable highest receive level if a transmit signal were received as it is. Therefore, a signal from 2-3-1 to 2-8 is set so that the level is lower than an actual transmit signal. A separator is implemented for instance by a coupler.

The reason why a second switch is used is to send a transmit signal of the branch 1 to the receiver in one of the branches except the branch 1.

The reason why a fourth switch is used is that an i'th receiver requests only a signal of an i'th antenna element during receive period in communication, while it requests a signal sent by a first transmitter (2-3-1) for obtaining calibration value.

(2) Simultaneous to the step (1), a signal is sent from the transmitter (2-3-i) in the i'th branch to the receiver 2-4-1 in the first branch. This is shown by S-22 in FIG. 3. The signal passes the separator (2-5-i), the third switch (2-7) and the fourth switch (2-8-1). With the process in this step, the amplitude/phase calibration calculation circuit 2-9 receives the value;

$$T_iR_1 \tag{8}$$

The reason why a separator is used for sending a signal from 2-3-i to 2-8 is the same as that in the step (1) (S-21).

The reason why the third switch is used is to send one of the transmit signals of the i'th branch (i=2 through N) to the receiver in the first branch.

The reason why the fourth switch is used is that a first receiver requests only a signal from an antenna element during reception period in communication, while it requests a signal from a transmitter (2-3-i) for calibration.

(3) The ratio of the equations (7) and (8) (=equation (7)/equation (8)) provides the equation (5). Thus, the calibration value of the i'th branch relative to the first branch (S-23) is obtained.

(4) The above steps (1) through (3) are repeated after the value i is incremented (i=i+1) until the value i reaches the value N.

Finally, the weight multiplier circuit 2-11 multiplies the calibration value thus obtained and the amplitude/phase value of the receive signal, and the transmission is carried out by using the product of said multiplication. Thus, the calibration among the branches of an array antenna is carried out in a transmitter/receiver itself, and an excellent transmission is provided as if no amplitude difference and no phase difference among the branches existed. Thus, according to the present invention, an amplitude and phase among branches are calibrated.

It should be appreciated that the present invention provides the calibration values by using an actual transmission signal, and therefore, the calibration is carried out on real time bases during actual communication. The present invention can compensate temperature characteristics in a high frequency circuit. That compensation has been impossible in a prior art.

Other Embodiments of the Present Invention

Figure 4:
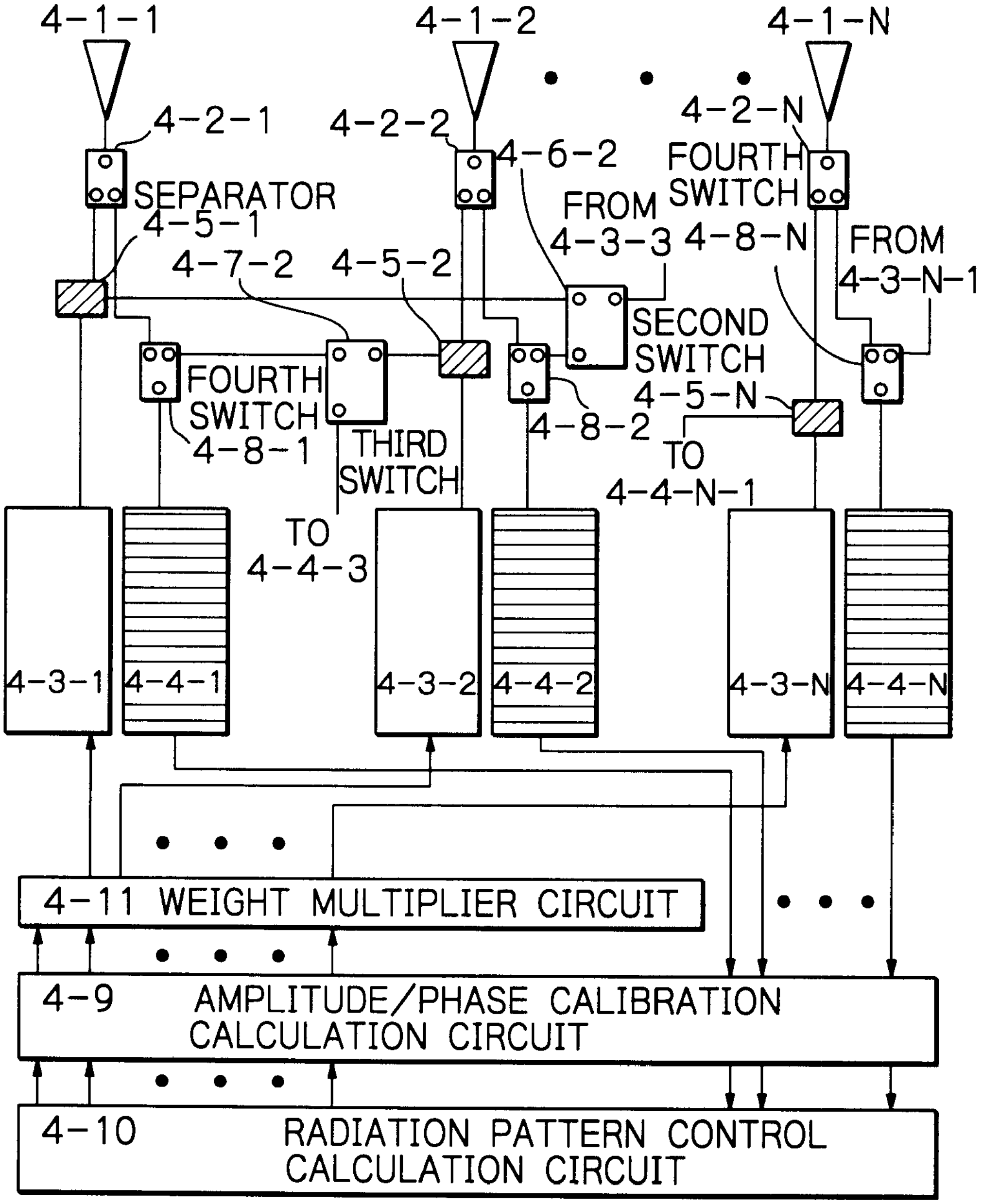
FIG. 4 shows a block diagram of another embodiment of the present invention.
Figure 5:
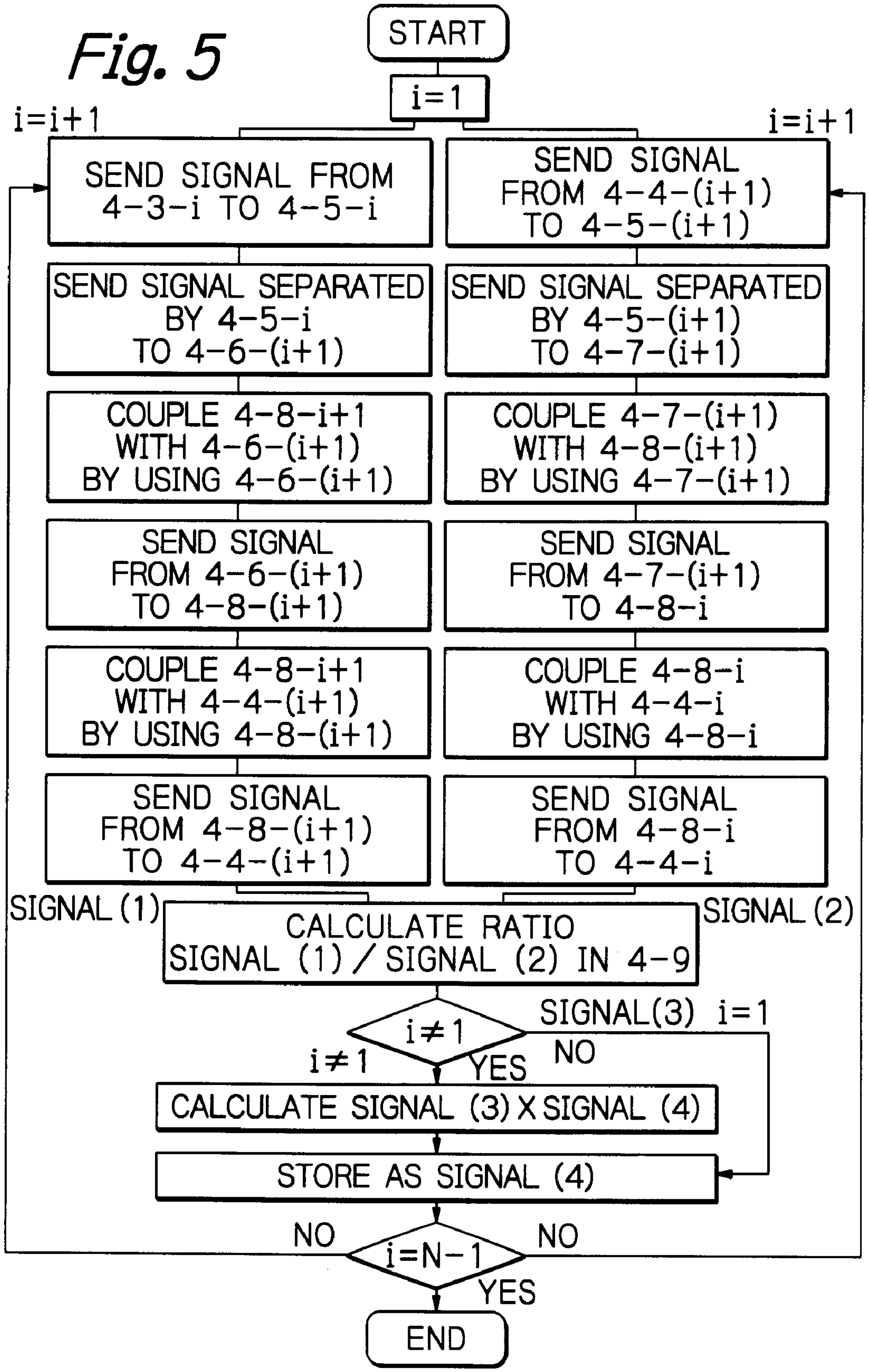
FIG. 5 shows an operational flow chart for calibration according to an embodiment of FIG. 4.

FIG. 4 shows a block diagram of the present invention, and FIG. 5 shows an operational flow chart for calibration using the circuit of FIG. 4. In FIG. 4, the symbol i in 4-k-i (1<i<N, i is an integer) shows in general a device related to an i'th branch. An arrow in FIG. 4 shows direction of a signal. The numeral 4-1 (4-1-1 through 4-1-N) is an antenna element, 4-2 (4-2-1 through 4-2-N) is a first switch for switching an antenna element between transmission and reception, 4-3 (4-3-1 through 4-3-N) is a transmitter, 4-4

(4-4-1 through 4-4-N) is a receiver, 4-5 (4-5-1 through 4-5-N) is a separator, 4-7-k (2<k<N−1; k is an integer) is a third switch for coupling a signal from 4-5-k either to 4-4-k−1 or to 4-4-k+1, 4-6-k (2<k<N−1; k is an integer) is a second switch for coupling a signal either from 4-5-k−1 or from 4-5-k+1 to 4-4-k, 4-8 (4-8-1 through 4-8-N) is a fourth switch for coupling 4-4 with either 4-6 or 4-7, 4-9 is an amplitude/phase calibration calculation circuit, and 4-10 is a radiation pattern control calculation circuit. The numeral 4-11 is a weight multiplier circuit.

Now, it is described how the value of equation (5) is obtained in accordance with the flow chart of FIG. 5.

(1) It is assumed that i=1. In this case, the calibration value between the first branch and the second branch is obtained. The transmitter (4-3-1) of the first branch sends a signal to the receiver (4-4-2) of the second branch, through the separator (4-5-1) and the second switch (4-6-2), and the fourth switch (4-8-2). With this process, the output value of the amplitude/phase calibration calculation circuit is as follows.

$$T_1R_2 \tag{9}$$

The reason why a separator is used for sending a signal from 4-3-1 to 4-4-2 is that a power amplifier is used at input side of an antenna element for providing enough power in transmission, and if a receiver received a transmit power as it is, the receive level would exceed the allowable highest receive level. Therefore, a signal from 4-3-1 to 4-4-2 is attenuated as compared with an actual transmit signal. A separator is for instance implemented by using a coupler.

The reason why a second switch is used is that the receiver 4-4-2 must receive not only the transmit signal of the branch 1 but also the transmit signal of the branch 3, as described later.

The reason why a fourth switch is used is that a receiver requests only a signal from an antenna element during actual communication, and further it requests a signal from the transmitter (4-3-1) of the first branch.

(2) The transmitter (4-3-2) of the second branch sends a signal to the receiver (4-4-1) of the first branch, through the separator (4-5-2), the third switch (4-7-2) and the fourth switch (4-8-1). An output of the amplitude/phase calibration calculation circuit with this process is as follows.

$$T_2R_1 \tag{10}$$

The reason why the separator is used for sending a signal from 4-3-2 to 4-4-1 is the same as described above.

The reason why the third switch is used is that a transmit signal of the branch 2 must be sent not only to a receiver of the branch 1 but also to a receiver of the branch 3, as described later.

The reason why the fourth switch is used is that the receiver 4-4-1 requests only a signal of an antenna element 4-1-1 during actual communication, and requests only a signal of the transmitter 4-3-2 during calibration process. (3) The ratio of the equation (9) and the equation (10) is obtained (equation (9)/equation (10)) so that the value of the equation (5) when i=1 is obtained. Thus, the calibration value of the branch 2 relative to the branch 1 is obtained.

(4) Then, the value i is implemented so that i=i+1. The above processes (1) and (2) are repeated, so that the following values are obtained in the processes (1) and (2), respectively.

$$T_2R_3 \tag{11}$$

$$T_3R_2 \tag{12}$$

The ratio of (equation (11)/equation (12)) provides the calibration value of the third branch relative to the second branch.

(5) When an actual transmission is carried out by using calibrated values, the calibration values of all the branches relative to the specific reference branch must be obtained. It is assumed that the reference branch is the first branch. It is assumed that $H_{2.1}$=(equation (9)/equation (10)), and $H_{3.2}$=(equation (11)/equation (12)), then, the calibration value $H_{3.1}$ of the third branch relative to the first branch is as follows.

$$\begin{aligned} H_{3,1} &= H_{2,1}\ H_{3,2} \\ &= [T_1R_2/(T_2R_1)][T_2R_3/(T_3R_2)] \\ &= T_1R_3/(T_3R_1) \\ &= (R_3/T_3)/(R_1/T_1) \end{aligned} \tag{13}$$

(6) As described above, the calibration value of the i'th branch is obtained by the calibration value $H_{i,i-1}$ of the i'th branch relative to the i−1 branch, and the calibration value $H_{i-1,1}$ of the i−1 branch relative to the first branch, as follows.

$$\begin{aligned} H_{i,1} &= H_{i-1,1}\ H_{i,i-1} \\ &= [T_1R_{i-1}/(T_{i-1}R_1)][T_{i-1}R_i/(T_iR_{i-1})] \\ &= T_1R_i/(T_iR_1) \\ &= (R_i/T_i)/(R_1/T_1) \end{aligned} \tag{14}$$

Finally, the weight multiplier circuit carries out the multiplication of the calibration value thus obtained and the received amplitude/phase value, for each branch. The transmission is carried out by using the weighted values. Thus, the compensation of the amplitude values and the phase values between branches of an array antenna is carried out within a transceiver itself, and a transmission as if no amplitude error and no phase error exist is carried out.

As described above, the present embodiment provides the compensation of amplitude error and phase error among branches of an array antenna during actual communication. Thus, the compensation of temperature characteristics, which is impossible in a prior art, is possible in the present invention.

Further, the structure of FIG. 4 has the advantage that a number of outputs of a switch is only 2 while it is N−1 in the FIG. 2 embodiment, although a number of switches for calibration increases as compared with that of FIG. 2. A switch having two output contacts is implemented by a commercially obtainable switch, and therefore, the structure of FIG. 4 is implemented even when a number of antenna elements increases.

Figure 6:
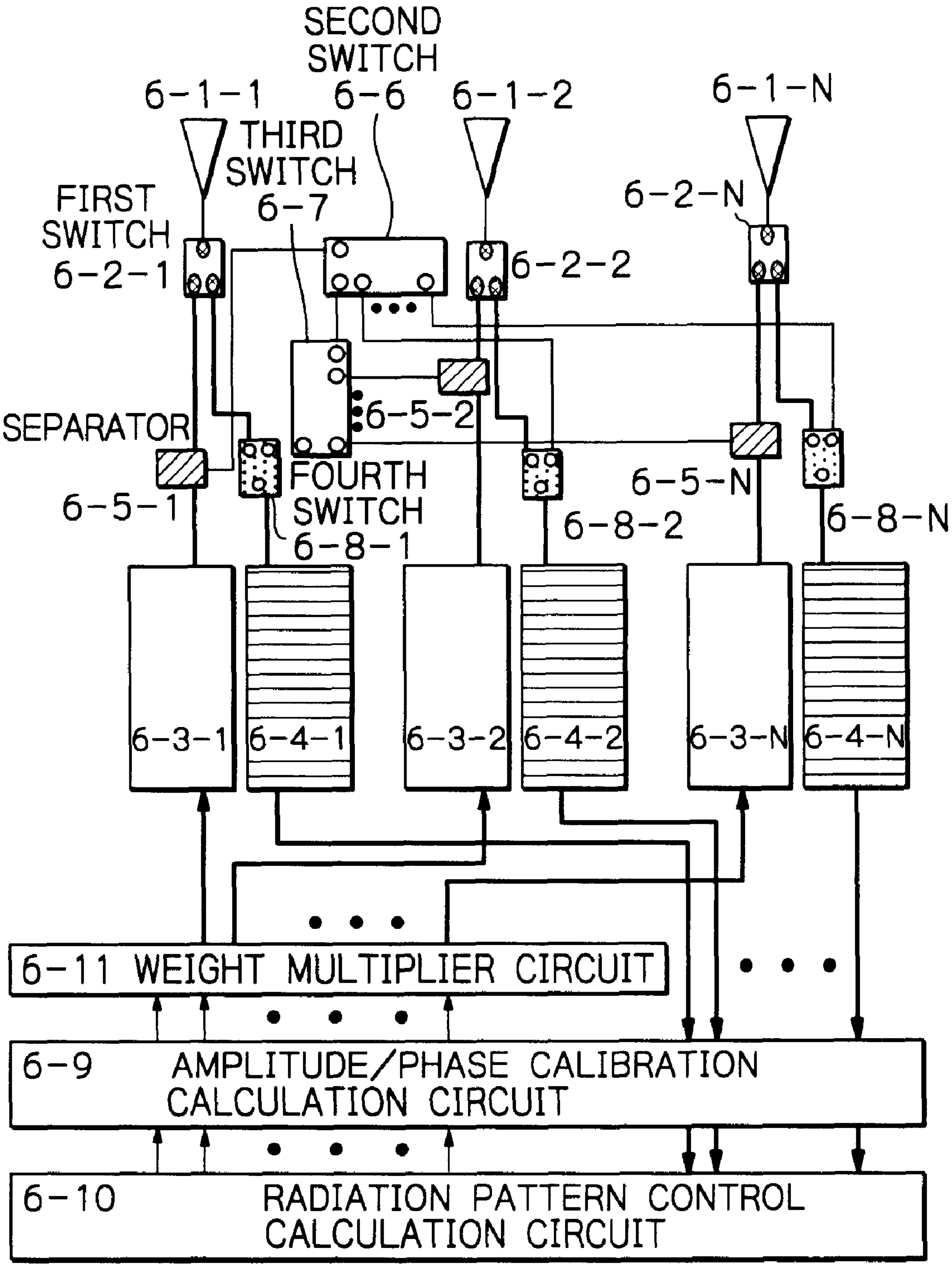
FIG. 6 shows a block diagram of still another embodiment of the present invention.
Figure 7:
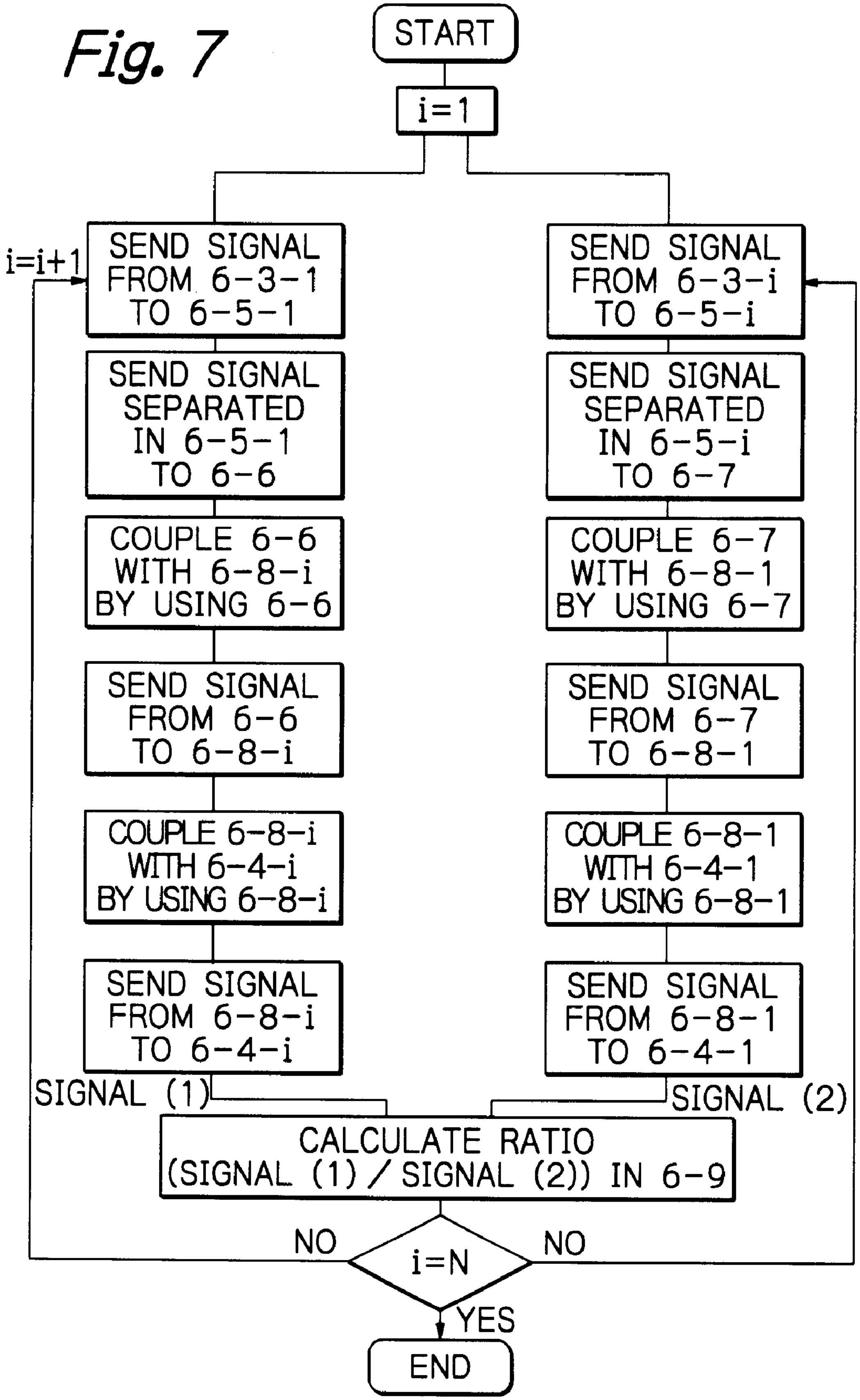
FIG. 7 shows an operational flow chart for calibration according to an embodiment of FIG. 6.
Figure 8:
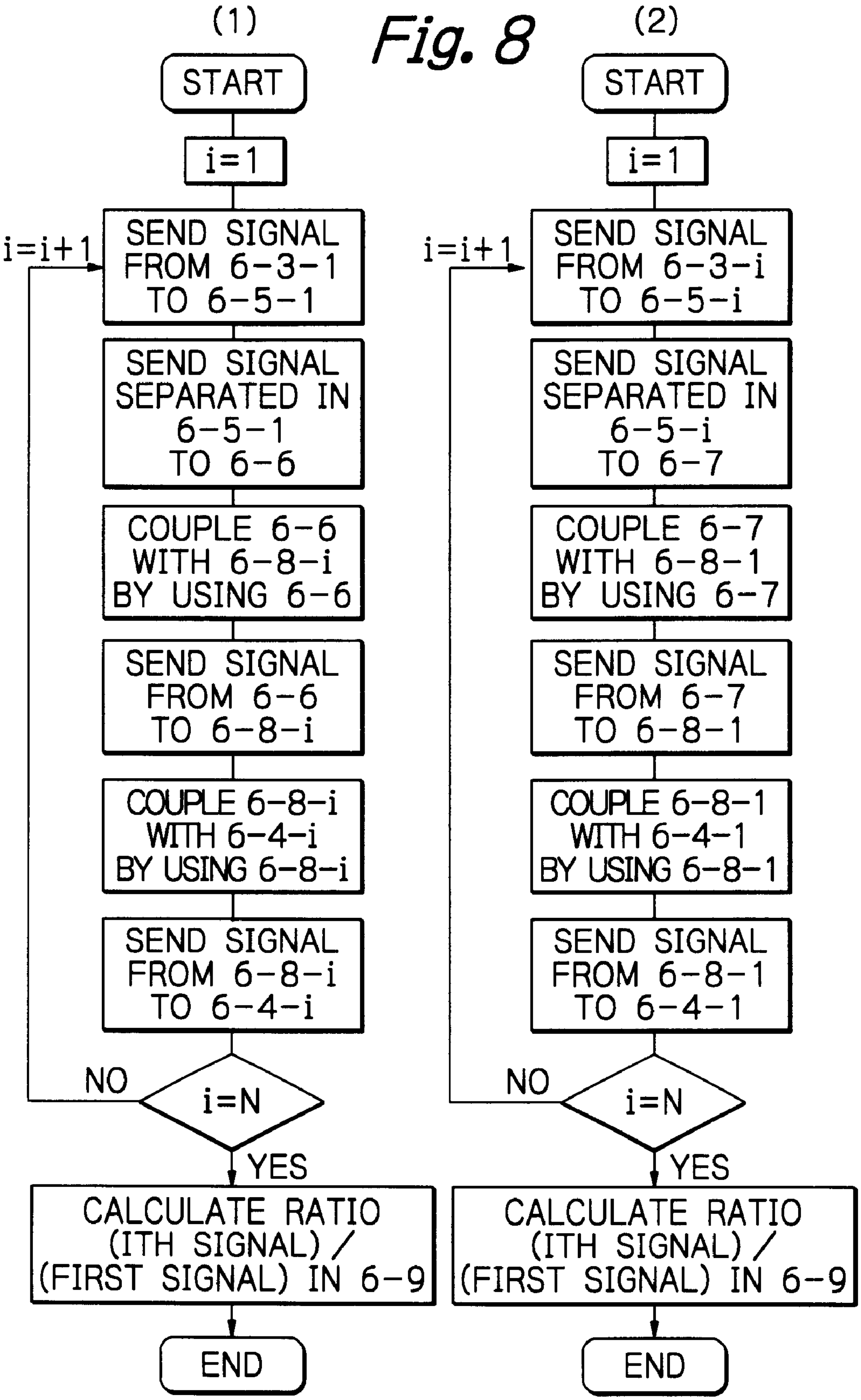
FIG. 8 shows another operational flow chart for calibration according to an embodiment of FIG. 6.

FIG. 6 is a block diagram of still another embodiment of the present invention, and FIG. 7 and FIG. 8 show an operational flow chart for calibration by using an apparatus of FIG. 6.

In FIG. 6, the numeral i in 6-k-i (1<k<i (1<i<N; i is an integer) shows an apparatus related to an i'th branch. An arrow in FIG. 6 shows direction of a signal. The numeral 6-1 (6-1-1 through 6-1-N) shows an antenna element, 6-2 (6-2-1 through 6-2-N) shows a first switch for switching an antenna element between transmission and reception, 6-3 (6-3-1 through 6-3-N) is a transmitter, 6-4 (6-4-1 through 6-4-N) is a receiver, 6-5 (6-5-1 through 6-5-N) is a separator, 6-6 is a second switch for connecting a signal from 6-5-1 to one of receivers 6-4-1 through 6-4-N, 6-7 is a third switch for connecting a signal from a receiver 6-4-1 to one of separators 6-5-1 through 6-5-N, 6-8 (6-8-1 through 6-8-N) is a fourth switch for connecting a receiver 6-4-i to either a second switch 6-6 or a third switch 6-7, 6-9 is an amplitude/phase calibration calculation circuit, and 6-10 is a radiation pattern control calculation circuit. The numeral 6-11 is a weight multiplier circuit.

Now, the operation for obtaining the value of the equation (5) for each branch is described in accordance with FIG. 7.

(1) The transmitter (6-3-1) of the first branch sends a signal to the receiver (6-4-i) of the i'th branch, through the separator (6-5-1), the second switch 6-6 and the fourth switch (6-8-i). An output obtained at an output of the amplitude/phase calibration calculation circuit 6-9 with this process is as follows.

$$T_1R_i \quad (15)$$

The reason why a separator is used for sending a signal from 6-3-1 to 6-4-i is that since a power amplifier is used in a transmitter for providing sufficient transmission power, and a receive level would exceed the allowable maximum level if the power amplified signal is applied to a receiver as it is. Therefore, a signal from 6-3-1 to 6-7 is attenuated as compared with an actual communication signal. A separator is for instance implemented by a coupler.

The reason why a second switch is used is to send a transmission signal of the first branch 1 to one of the receivers of the branches 1 through N.

The reason why a fourth switch is used is that a receiver requests only a signal received by an antenna element i during actual communication, while a receiver requests only a signal from a transmitter 6-3-1 during calibration operation.

(2) A signal is sent from a transmitter (6-3-i) of the i'th branch to a receiver (6-4-1) of the first branch 1 through the separator (6-5-i), the third switch 6-7 and the fourth switch 6-8-1). Thus, an output of the amplitude/phase calibration calculation circuit is as follows.

$$T_iR_1 \quad (16)$$

The reason of the use of a separator for sending a signal from 6-3-i (i=2–N) to 6-7 is the same as that in the first process (1).

The reason of the use of a third switch is to send a signal of one of transmitters to a receiver of the first branch 1.

The reason of the use of a fourth switch is that a receiver 6-4-1 requests only a signal from an antenna element 6-1-1 during actual communication, while it requests a signal from a transmitter (6-3-i) during calibration operation.

(3) The ratio (equation (15)/equation (16)) provides the value of the equation (5). Thus, the calibration value of the branch i relative to the first branch 1.

(4) The value i is incremented so that i=i+1, and the processes (1) through (3) are repeated until i=N.

Finally, the weight multiplier circuit multiplies the calibration value thus obtained to received amplitude/phase value for each branch, and the transmission is carried out by using the weighted values. Thus, an array antenna is compensated for amplitude error and phase error among branches. Thus, the compensation is carried out by using an actual transceiver.

Thus, the current embodiment provides the compensation of amplitude error and phase error among branches of an array antenna, similar to previous embodiments. The calibration circuit according to the present invention provides calibration values by using actual communication signal, the real time calibration is possible during actual communication, and the compensation for temperature variation, which is impossible in a prior art, is possible.

By the way, when an adaptive array antenna operates by using an algorithm for estimating direction of receive signal, calibration values of a branch of not only the total of a transmitter and a receiver in each branch, but also a calibration value of a branch of a sole transmitter and a sole receiver are requested. FIG. 8 shows an operational flow chart for providing a calibration value of a transmitter and a receiver, separately. With the loop (1) in FIG. 8, the value of the equation (15) is obtained for each of the branches 1 through N, and then, the following calibration value of a receive side only is obtained.

$$R_i/R_1 \quad (17)$$

Similarly, with the loop (2) in FIG. 8, the value of the equation (16) is obtained for each of the branches 1 through N, and then, the following calibration value of a transmit side only is obtained.

$$T_i/T_1 \quad (18)$$

Figure 9:
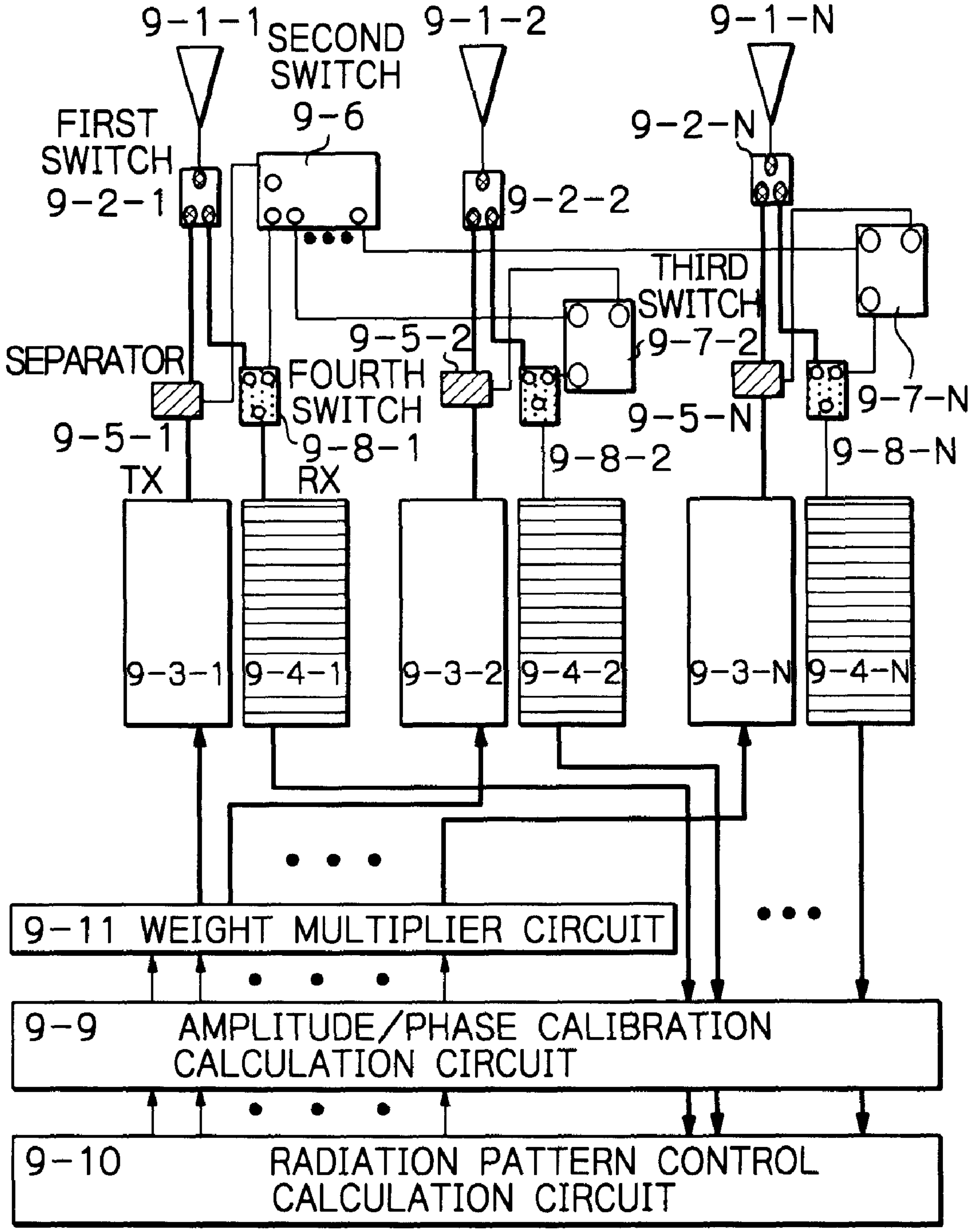
FIG. 9 shows a block diagram of still another embodiment of the present invention.
Figure 10:
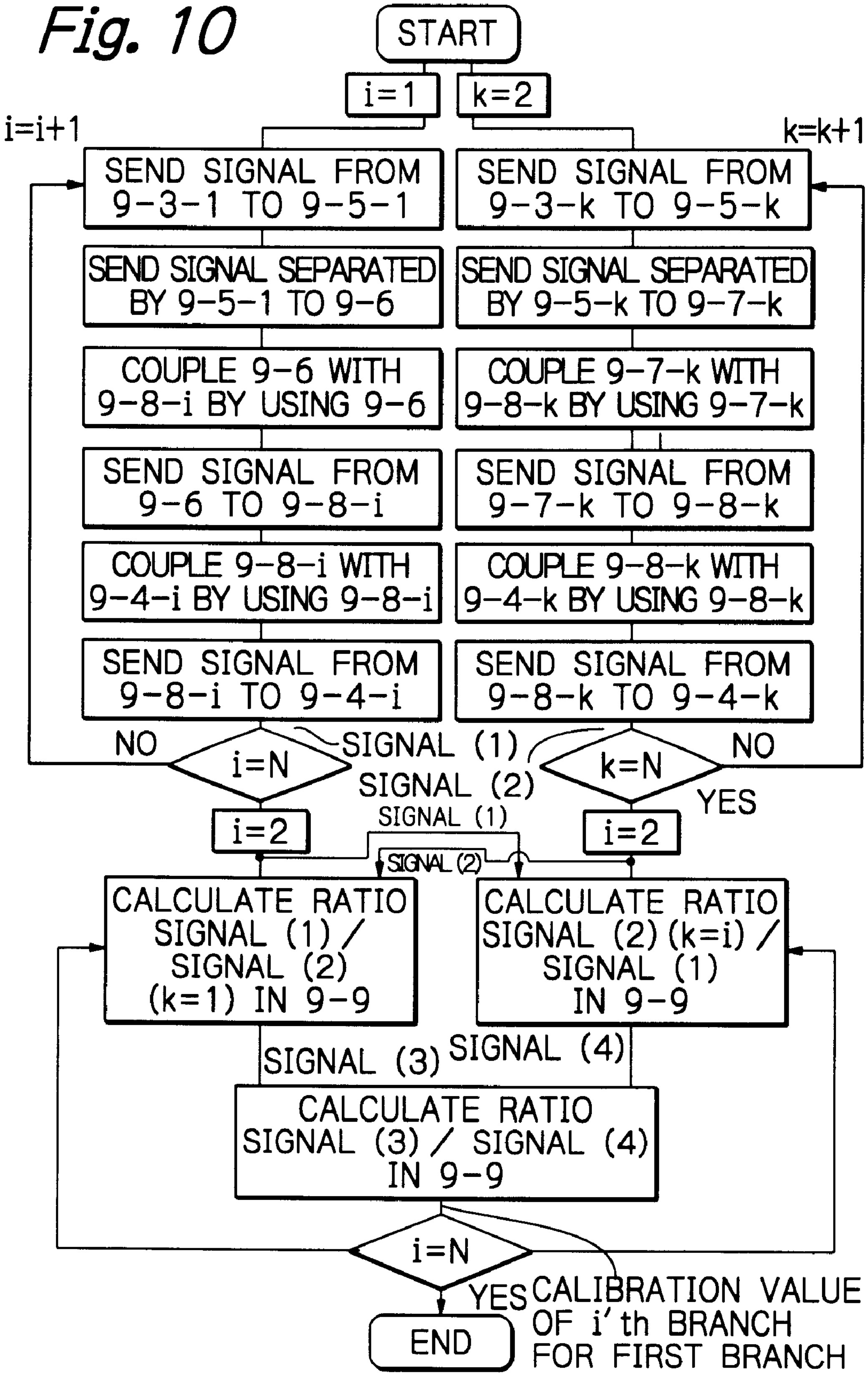
FIG. 10 shows an operational flow chart for calibration according to an embodiment of FIG. 9, FIGS. 11(A) and 11(B) show an example of null depth when an amplitude and a phase have an error among each branches from an ideal condition of an amplitude and a phase of an array antenna.
Figure 11A:
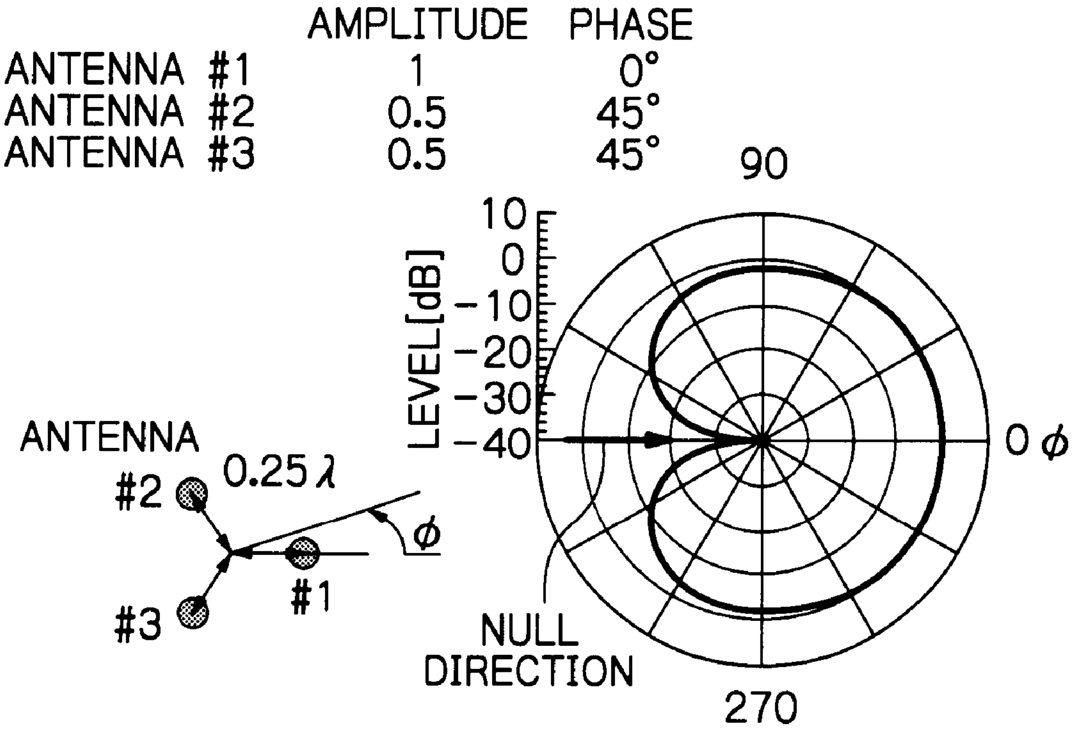
Fig. 11(A) PRIOR ART
Figure 11B:
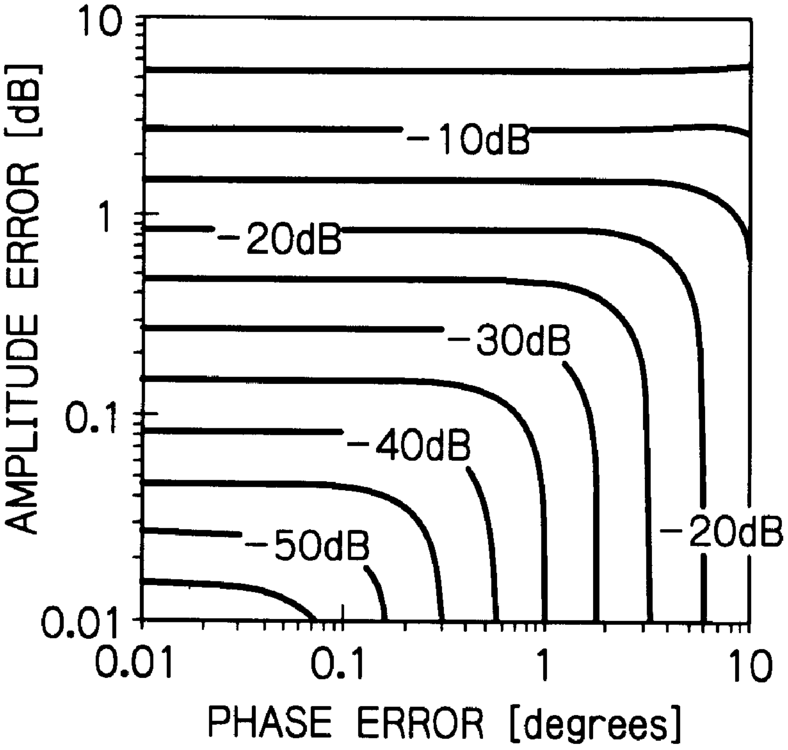
Fig. 11(B) PRIOR ART
Figure 12:
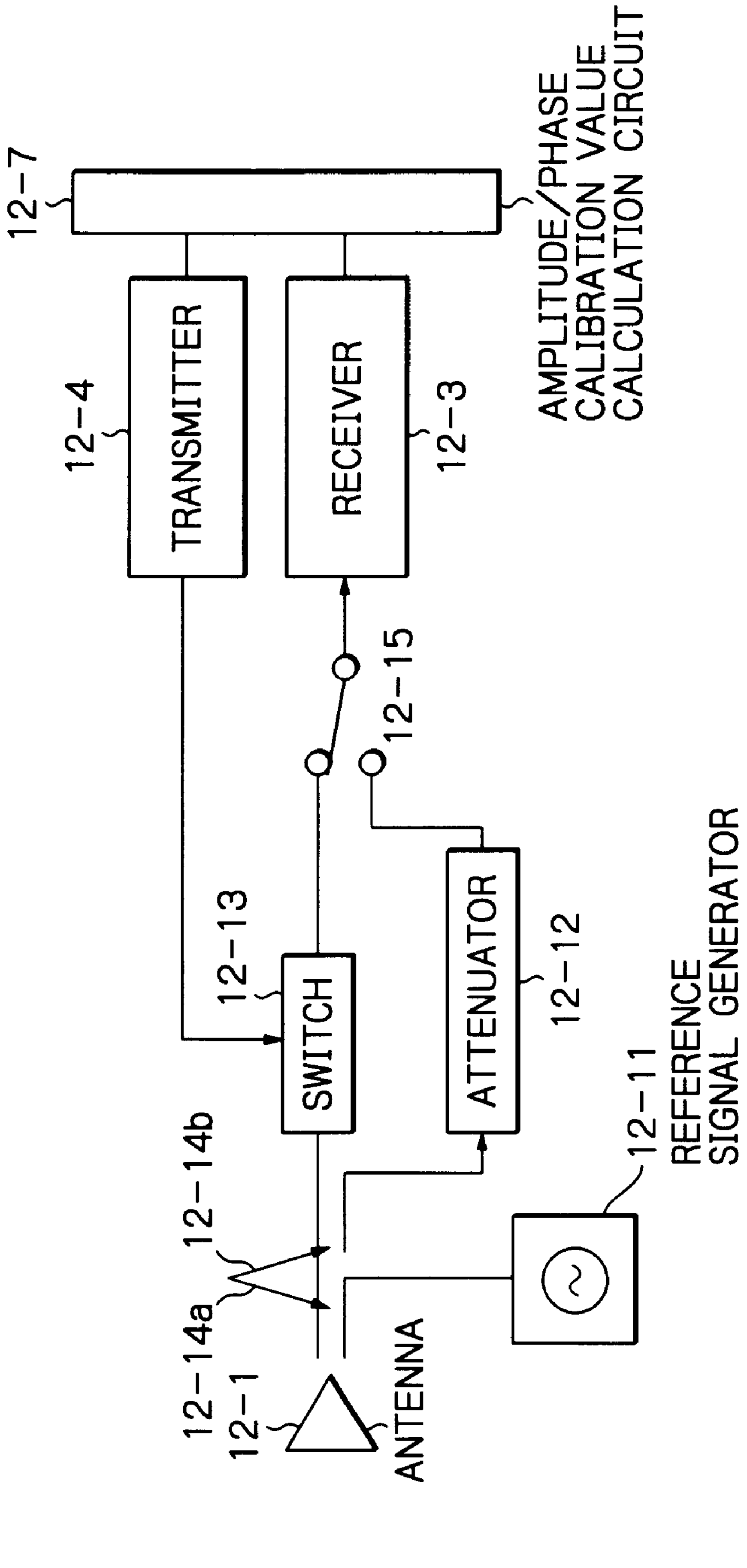
Fig. 12 PRIOR ART
FIG. 12 shows a structure of a prior calibration circuit.
Figure 13:
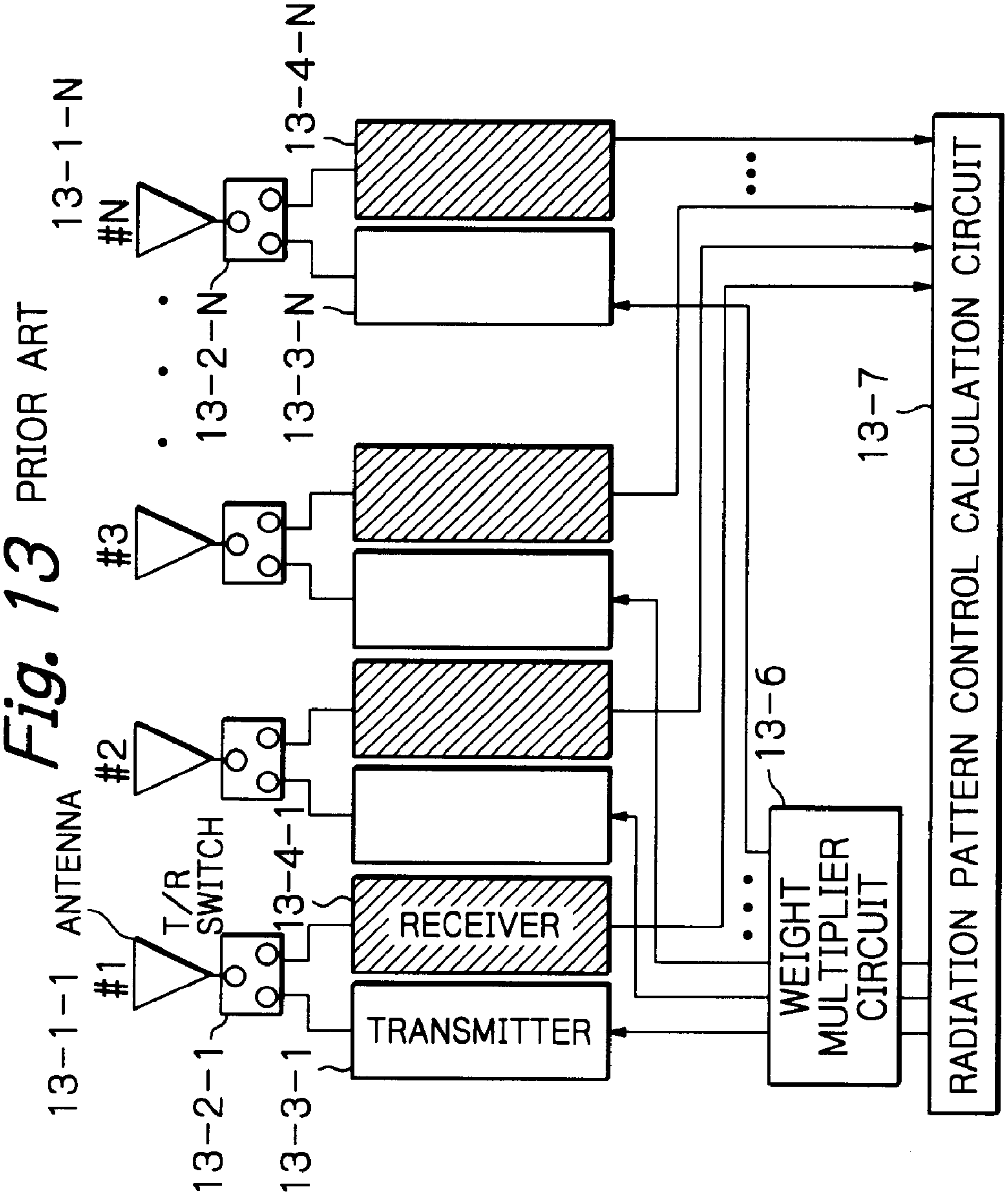
Fig. 13 PRIOR ART
FIG. 13 shows a structure of a prior adaptive array antenna system used in a TDD communication system.

FIG. 9 is a block diagram of still another embodiment of the present invention, and FIG. 10 is an operational flow chart for calibration by using the apparatus of FIG. 9.

In FIG. 9, the numeral i in 9-k-i (1<i<N; i is an integer) shows an apparatus related to the i'th branch, and an arrow in FIG. 9 shows direction of a signal.

In FIG. 9, the numeral 9-1 (9-1-1 through 9-1-N) shows an antenna element, 9-2 (9-2-1 through 9-2-N) shows a first switch for switching an antenna element between a transmission and reception, 9-3 (9-3-1 through 9-3-N) shows a transmitter, 9-4 (9-4-1 through 9-4-N) is a receiver, 9-5 (9-5-1 through 9-5-N) is a separator, 9-6 is a second switch for connecting a signal from a separator 9-5-1 to one the receivers 9-4-1 through 9-4-N, 9-7 (9-7-2 through 9-7-N) is a third switch for connecting a signal of 9-5-m (2<m<N) to a receiver 9-4-m, 9-8 (9-8-1 through 9-8-N) is a fourth switch for connecting a receiver 9-4 (9-4-1 through 9-4-N) to either 9-6 or 9-7, 9-9 is an amplitude/phase calibration calculation circuit, 9-10 is a radiation pattern control calculation circuit, and 9-11 is a weight multiplier circuit.

The operation for obtaining the value of the equation (5) is now described in accordance with a flow chart of FIG. 10.

(1) A transmitter 9-3-1 of the first branch sends a signal to a receiver 9-4-i of the i'th branch (1<i<N). This signal passes the separator 9-5-1, the second switch 9-6, and the fourth switch 9-7-i. An output of the amplitude/phase calibration calculation circuit 9-9 with this process is as follows.

$$T_1R_i \quad (19)$$

The reason why a separator is used for sending a signal from the transmitter 9-3-1 to the second switch 9-6 is that a receive level of a receiver would exceed an allowable level if no separator were used since a power amplifier is used in a transmitter, and therefore, a signal from 9-3-1 to 9-6 is attenuated as compared with an actual communication level. A separator is implemented for instance by a coupler.

The reason why the second switch 9-6 is used is to send a signal from the first branch to a receiver in one of the branches 1 through N.

The reason why the fourth switch 9-8 (9-8-1 through 9-8-N) is used is that a receiver requests only a signal of an antenna element during actual communication, while it requests only a signal from a transmitter 9-3-1 of the first branch during calibration process. (2) A transmitter 9-3-k in the k'th branch (1<k<N) sends a signal to a receiver 9-4-k in the k'th branch, through a separator 9-5-k and a second switch 9-7-k. An output of the amplitude/phase calibration calculation circuit 9-9 with this process is as follows.

$$T_k R_k \tag{20}$$

The reason of the use of a separator for sending a signal from 9-3-k to 9-7-k is the same as the process (1).

The reason of the use of the third switch 9-7 is to send a signal of the transmitter of the k'th branch to the receiver of the k'th branch.

The reason of the use of the fourth switch 9-8 is that a receiver requests only a signal of an antenna element during an actual communication, while it requests only a signal of a transmitter 9-3-k during calibration process.

(3) The values i and k are incremented so that i=i+1 and k=k+1, and the processes (1) and (2) are repeated until i=N and k=N.

(4) In the equation (20) the value k=1 is assigned, and when the ratio (equation (19)/equation (20)) is obtained, and following relation is provided.

$$T_1 R_i/(T_1 R_1) = R_i/R_1 \tag{21}$$

The equation (21) shows the calibration value of the i'th branch relative to the first branch.

(5) The ratio of (equation (20)/equation (20)) is calculated when k=i (i is not 1), and the following relation is obtained.

$$T_i R_i/(T_1 R_i) = T_i/T_1 \tag{22}$$

The equation (22) shows the calibration value of the transmitter in the i'th branch relative to the first branch.

(6) When the ratio (equation (21) equation (22)) is calculated, the following relation is obtained.

$$(R_i/R_1)/(T_i/T_1) = T_1 R_i/(T_i R_1) = H_i \tag{23}$$

Thus, the equation (5), or the calibration value of the i'th branch relative to the first branch is obtained.

Finally, the weight multiplier circuit 9-11 multiplies the calibrated values thus obtained and the received amplitude/phase values for each branches, and the transmission is carried out by using the weighted values thus calculated. Therefore, the compensation of amplitude and phase among branches of an array antenna is effected within a transceiver itself, and the transmission as if no amplitude error and no phase error existed is carried out. Thus, the current embodiment provides the compensation of amplitude error and phase error among branches of an array antenna. The present calibration system provides the calibration values by using actual communication signals, and therefore, a real time calibration is possible. Thus, the compensation of temperature characteristics is possible in the present invention, although that compensation was impossible in a prior art.

As can be seen from the result of the equations (21) and (22), The structure of FIG. 9 can provide the calibration values of a transmit side and a receive side, separately, as is the case of the structure of FIG. 6. Further, as a transmit signal is fed back to a receiver of own branch only, except a reference branch, the length of a wire is shorter than that of other embodiments. This is advantageous to manufacture a calibration system.

Effect of the Invention

As described above in detail, the present invention carries out calibration within own transceiver itself, and therefore, decrease of transmission efficiency which would occur when an external signal is used, is prevented. Further, as the calibration values are obtained during actual communication, the amplitude error and the phase error due to the environment conditions because of location of base stations and the change of the temperature characteristics during communication can be compensated.

What is claimed is:

1. An adaptive array antenna system comprising;

N (N=>2, N is an integer) number of antenna elements (1-1-1 through 1-1-N), N number of transmitters (1-3-1 through 1-3-N), N number of receivers (1-4-1 through 1-4-N), a directivity calculation circuit (1-7) for controlling radiation pattern of said adaptive antenna system by weighting amplitude and phase of signals applied to a respective receiver related to each antenna element, and combining weighted signals, said adaptive array antenna being used in Time Division Duplex communication system, each transmitter being coupled with a related antenna element during transmit time slot in communication, and having means (1-5-1 through 1-5-N) for sending a part of transmit signal to at least one receiver, amplitude/phase calibration calculation circuit (1-6) receiving outputs of at least two receivers which receive a signal from a transmitter during transmit time slot, and providing amplitude/phase calibration value of a branch related to said transmitter and said receivers by ratio of outputs of said at least two receivers.

2. An adaptive array antenna system according to claim 1 comprising;

N (N=>2, N is an integer) number of antenna elements (2-1-1 through 2-1-N), N number of transmitters (2-3-1 through 2-3-N), N number of receivers (2-4-1 through 2-4-N), N number of first switches (2-2-1 through 2-2-N) provided for each antenna element for selectively coupling a respective antenna element either to a respective transmitter or to a respective receiver, a radiation pattern control calculation circuit (2-10) for controlling radiation pattern of said array antenna by weighting signals applied to each receivers with amplitude and phase, and combining weighted signals, a weight multiplier circuit (2-11) for multiplying transmit signal and amplitude and phase obtained in said radiation pattern control calculation circuit, N number of separators (2-5-1 through 2-5-N) provided for each transmitters for coupling an output of a respective transmitter to a respective antenna element and separating a part of transmit signal, a second switch (2-6) for coupling a signal separated by the first separator (2-5-1) with one of second through N'th receivers (2-4-2 through 2-4-N), a third switch (2-7) for coupling signals separated by second through N'th separators (2-5-2 through 2-5-N) with the first receiver (2-4-1), fourth switches (2-8-1 through 2-8-N) for coupling an input of each receiver (2-4-i) with either a signal of a respective antenna element (2-1-i) through a respective first switch (2-2-i), or a signal from said second switch (2-6) or said third switch (2-7), an amplitude/phase calibration value calculation circuit (2-9) for providing amplitude/phase calibration value of each antenna element by using an amplitude value and a phase value obtained in each receivers.

3. An adaptive array antenna system according to claim 2, wherein;

said amplitude/phase calibration value calculation circuit (2-9) provides calibration value of i'th antenna element by;

separating a signal from first transmitter (2-3-1), coupling the separated signal with i'th (2=<i=<N, i is an integer) fourth switch (2-8-i) through said second switch (2-6), obtaining a value (1) at an output of said i'th receiver (2-4-i) which receives said separated signal through i'th fourth switch (2-8-i), separating a signal from i'th transmitter (2-3-i), coupling the separated signal with first fourth switch (2-8-1) through said third switch (2-7), obtaining a value (2) at an output of first receiver (2-4-1) which receives said separated signal from i'th transmitter (2-4-i), and providing ratio of (said value (1))/(said value (2)) as calibration value of i'th branch.

4. An adaptive array antenna system according to claim 1 comprising;

N (N=>2, N is an integer) number of antenna elements (4-1-1 through 4-1-N), N number of transmitters (4-3-1 through 4-3-N), N number of receivers (4-4-1 through 4-4-N), first switches (4-2-1 through 4-2-N) provided for each antenna element for switching an antenna element (4-1-i) either to a respective transmitter (4-3-i) or to a respective receiver (4-4-i), a radiation pattern control calculation circuit (4-10) for controlling radiation pattern of said adaptive array antenna system by weighting amplitude and phase of a signal applied to each receivers and combining weighted values, a weight multiplier circuit (4-11) for multiplying transmit signal, and amplitude and phase obtained in said radiation pattern control calculation circuit, N number of separators (4-5-1 through 4-5-N) for separating an output of each transmitter into two signals, (N−2) number of second switches (4-6-2 through 4-6-(N−1)) for connecting an input of k'th receiver (4-4-k) either to (k−1)'th separator (4-5-k) (2<=k<=N−1, k is an integer) or to (k+1)'th separator (4-5-(k+1)), (N−2) number of third switches (4-7-2 through 4-7-(N−1)) for connecting k'th separator (4-5-k) either to an input of (k−1)'th receiver (4-4-(k−1)) or an input of (k+1)'th receiver (4-4-(k+1)), fourth switches (4-8-1 through 4-8-N) for connecting an input of a respective receiver (4-4-i) either to a respective antenna element (4-1-i) through one (4-2-i) of said first switches, or to a signal from said second switch (4-6-i) or said third switch (4-7-i), an amplitude/phase calibration value calculation circuit (4-9) for providing amplitude/phase calibration value of each antenna element by using an amplitude value and a phase value obtained in each of said receivers.

5. An adaptive array antenna system according to claim 4, wherein;

said amplitude/phase calibration value calculation circuit (4-9) calculates;

$$C(i)=A(i)/B(i),\ (1<=i<=N-1,\ i \text{ is an integer})$$

and assigns amplitude/phase calibration value of (i+1)'th branch so that;

$$C(i) \text{ when } i=1$$

$$D(i)=C(i-1)C(i) \text{ when } i\neq 1$$

where A(i) is an output of (i+1)'th receiver (4-4-(i+1)) which receives an output of i'th transmitter (4-3-i) through i'th separator (4-5-i), said second switch (4-6-(i+1)), and (i+1)'th fourth switch (4-8-(i+1)), and B(i) is an output of i'th receiver (4-4-i) which receives an output of (i+1)'th transmitter (4-3-(i+1)) through (i+1)'th separator (4-5-(i+1)), said third switch (4-7-i), and i'th fourth switch (4-8-i).

6. An adaptive array antenna system according to claim 1 comprising;

N (N=>2, N is an integer) number of antenna elements (6-1-1 through 6-6-N), N number of transmitters (6-3-1 through 6-3-N), N number of receivers (6-4-1 through 6-4-N), first switches (6-2-1 through 6-2-N) for switching each antenna element (6-1-i) either to a respective transmitter (6-3-i) or to a respective receiver (6-4-i), a radiation pattern control calculation circuit (6-10) for controlling radiation pattern of said adaptive array antenna system by weighting amplitude and phase of a signal applied to each receivers and combining weighted values, a weight multiplier circuit (6-11) for multiplying transmit signal, and amplitude and phase obtained in said radiation pattern control calculation circuit, N number of separators (6-5-1 through 6-5-N) provided for each transmitters for separating an output signal of each transmitter, a second switch (6-6) for connecting a signal from a first separator (6-5-1) to one of first through N'th receivers (6-4-1 through 6-4-N), a third switch (6-7) for connecting an input of a first receiver (6-4-1) to one of first through N'th separators (6-5-1 through 6-5-N), N number of fourth switches (6-8-1 through 6-8-N) for connecting an input of a respective receiver (6-8-i) either to a first antenna element (6-1-1) through a first switch (6-2-1), or to a signal from a second switch (6-6) or a third switch (6-7), an amplitude/phase calibration value calculation circuit (6-9) for providing amplitude/phase calibration value of each antenna element by using an amplitude value and a phase value obtained in each receivers.

7. An adaptive array antenna system according to claim 6, wherein;

said amplitude/phase calibration value calculation circuit (6-9) provides calibration value of i'th antenna element by;

separating a signal from a first transmitter (6-3-1) by using a first separator (6-5-1), coupling the separated signal with i'th (1<=i<=N, i is an integer) fourth switch (6-8-i) through said second switch (6-6), obtaining a value (1) at an output of i'th receiver (6-4-i) which receives said separated signal through i'th fourth switch (6-8-i), separating a signal from i'th transmitter (6-3-i) by using an i'th separator (6-5-i), coupling the separated signal with first fourth switch (6-8-1) through said third switch (6-7), obtaining a value (2) at an output of a first receiver (6-4-1) which receives said separated signal from i'th transmitter (6-3-1) through said first fourth switch (6-8-1), and providing ratio of (said value (1))/(said value (2)) as calibration value of i'th antenna element.

8. An adaptive array antenna system according to claim 1, comprising;

N (N>=2, N is an integer) number of antenna elements (9-1-1 through 9-1-N), N number of transmitters (9-3-1 through 9-3-N), N number of receivers (9-4-1 through 9-4-N), a first switch (9-2-1 through 9-2-N) provided for each antenna elements for switching an antenna element either to a respective transmitter or to a respective receiver, a radiation pattern control calculation circuit (9-10) for controlling radiation pattern of said adaptive array antenna system by weighting amplitude and phase of a signal applied to each receivers and combining weighted values, a weight multiplier circuit (9-11) for multiplying transmit signal, and amplitude and phase obtained in said radiation pattern control calculation circuit, N number of separators (9-5-1 through 9-5-N) provided for each transmitters for separating a signal from a respective transmitter, a second switch (9-6) for connecting a signal of a first separator (9-5-1) to one of first through N'th receivers (9-4-1 through 9-4-N), a third switch (9-7-2 through 9-7-N) for connecting an input of k'th receiver either from a first separator (9-5-1) or from k'th (2<=k<=N, k is an integer) separator, N number of fourth switches (9-8-1 through 9-8-N) for connecting an input of a respective receiver to a signal either from a respective antenna element through a respective first switch, or from said second switch or said third switch, an amplitude/phase calibration value calculation circuit (9-9) for providing amplitude/phase calibration value of each antenna element by using an amplitude value and a phase value obtained in each receivers.

9. An adaptive array antenna system according to claim 8, wherein;

said amplitude/phase calibration value calculation circuit calculates;

$$C(i)=A(i)/A(1)$$

$$D(i)=B(k=i)/A(i)$$

and assigns C(i)/D(i) as an amplitude/phase calibration value of i'th antenna element, wherein;

A(i) is an output of i'th receiver (9-4-i) which receives an output of a first transmitter (9-3-1) through a first separator (9-5-1), a second switch (9-6), and i'th fourth switch (9-8-i), and B(k), (2<=k<=N, k is an integer), is an output of k'th receiver (9-4-k) which receives an output of k'th transmitter through k'th separator (9-5-k), a third switch (9-7-2) and k'th fourth switch (9-8-k).

* * * * *